US012809126B2

(12) United States Patent
Kwon

(10) Patent No.: US 12,809,126 B2
(45) Date of Patent: Nov. 24, 2026

(54) OPTICAL SYSTEM AND CAMERA MODULE COMPRISING SAME

(71) Applicant: LG INNOTEK CO., LTD., Seoul (KR)

(72) Inventor: Duk Keun Kwon, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 684 days.

(21) Appl. No.: 18/043,802

(22) PCT Filed: Sep. 2, 2021

(86) PCT No.: PCT/KR2021/011860
§ 371 (c)(1),
(2) Date: Dec. 13, 2023

(87) PCT Pub. No.: WO2022/050723
PCT Pub. Date: Mar. 10, 2022

(65) Prior Publication Data
US 2024/0126046 A1 Apr. 18, 2024

(30) Foreign Application Priority Data
Sep. 2, 2020 (KR) ........................ 10-2020-0111471

(51) Int. Cl.
*G02B 9/62* (2006.01)
*G02B 3/00* (2006.01)
*G02B 13/00* (2006.01)

(52) U.S. Cl.
CPC ............ *G02B 9/62* (2013.01); *G02B 3/0087* (2013.01); *G02B 13/0045* (2013.01)

(58) Field of Classification Search
None
See application file for complete search history.

(56) References Cited

U.S. PATENT DOCUMENTS

| | | | |
|---|---|---|---|
| 6,339,509 | B1 | 1/2002 | Ohtake |
| 11,460,668 | B2 | 10/2022 | Wang et al. |

(Continued)

FOREIGN PATENT DOCUMENTS

| | | | |
|---|---|---|---|
| CN | 110286469 | A | 9/2019 |
| JP | 6698205 | B1 | 5/2020 |

(Continued)

OTHER PUBLICATIONS

International Search Report dated Nov. 10, 2021 in International Application No. PCT/KR2021/011860.

(Continued)

*Primary Examiner* — Dung T Nguyen
(74) *Attorney, Agent, or Firm* — SALIWANCHIK, LLOYD & EISENSCHENK

(57) ABSTRACT

An optical system disclosed to an embodiment includes first to sixth lenses sequentially disposed from an object side to an image side, the first lens has positive refractive power, and an object-side surface of the first lens is convex; At least one of the object-side surface and the image-side surface of the third lens includes an inflection point, and the sixth lens has negative refractive power and at least one of the object-side surface and the image-side surface includes an inflection point, the following Equation 1 may satisfy: $1<TTL/BFL<3$ (Equation 1), and TTL means a distance from an apex of the object-side surface of the first lens to an upper surface of the image sensor in a direction of the optical axis, and BFL means a distance from an apex of the image-side surface of the sixth lens to the upper surface of the image sensor in the direction of the optical axis.

20 Claims, 17 Drawing Sheets

(56) References Cited

U.S. PATENT DOCUMENTS

| | | | |
|---|---|---|---|
| 2015/0358516 A1 | 12/2015 | Baba | |
| 2016/0004041 A1 | 1/2016 | Chen et al. | |
| 2016/0109688 A1 | 4/2016 | Jo | |
| 2016/0161719 A1 | 6/2016 | Son | |
| 2017/0153421 A1 | 6/2017 | Baik | |
| 2019/0056569 A1 | 2/2019 | Yoo et al. | |
| 2019/0227282 A1 | 7/2019 | Son et al. | |
| 2020/0409040 A1* | 12/2020 | Oinuma | G02B 13/0045 |
| 2020/0409073 A1 | 12/2020 | Wang et al. | |

FOREIGN PATENT DOCUMENTS

| | | |
|---|---|---|
| KR | 10-1999-0079897 A | 11/1999 |
| KR | 2001-0014478 A | 2/2001 |
| KR | 10-2016-0046255 A | 4/2016 |
| KR | 10-2017-0136486 A | 12/2017 |
| KR | 10-2019-0090325 A | 8/2019 |
| KR | 10-2019-0095226 A | 8/2019 |

OTHER PUBLICATIONS

Supplementary European Search Report dated Aug. 20, 2024 in European Application No. 21864682.6.

Office Action dated Oct. 23, 2025 in Korean Application No. 10-2020-0111471.

Office Action dated Nov. 20, 2025 in Chinese Application No. 202180054280.2.

* cited by examiner (a)

(b)

(b)

(a)

OPTICAL SYSTEM AND CAMERA MODULE COMPRISING SAME

CROSS-REFERENCE TO RELATED APPLICATIONS

This application is the U.S. national stage application of International Patent Application No. PCT/KR2021/011860, filed Sep. 2, 2021, which claims the benefit under 35 U.S.C. § 119 of Korean Application No. 10-2020-0111471, filed Sep. 2, 2020, the disclosures of each of which are incorporated herein by reference in their entirety.

TECHNICAL FIELD

An embodiment relates to an optical system for improved optical efficiency and a camera module including the same.

BACKGROUND ART

The camera module captures an object and stores it as an image or video, and is installed in various applications. In particular, the camera module is produced in a very small size and is applied to not only portable devices such as smartphones, tablet PCs, and laptops, but also drones and vehicles to provide various functions. For example, the optical system of the camera module may include an imaging lens for forming an image, and an image sensor for converting the formed image into an electrical signal. In this case, the camera module may perform an autofocus (AF) function of aligning the focal lengths of the lenses by automatically adjusting the distance between the image sensor and the imaging lens, and may perform a zooning function of zooming up or zooning out by increasing or decreasing the magnification of a remote object through a zoom lens. In addition, the camera module employs an image stabilization (IS) technology to correct or inhibit image stabilization due to an unstable fixing device or a camera movement caused by a user's movement.

The most important element for this camera module to obtain an image is an imaging lens that forms an image. Recently, interest in high efficiency such as high image quality and high resolution is increasing, and research on an optical system including plurality of lenses is being conducted in order to realize this. For example, research using a plurality of imaging lenses having positive (+) and/or negative (−) refractive power to implement a high-efficiency optical system is being conducted. However, when a plurality of lenses is included, there is a problem in that it is difficult to derive excellent optical properties and aberration properties. In addition, when a plurality of lenses is included, the overall length, height, etc. may increase due to the thickness, interval, size, etc. of the plurality of lenses, thereby increasing the overall size of the module including the plurality of lenses. Therefore, a new optical system capable of solving the above problems is required.

DISCLOSURE

Technical Problem

The embodiment provides an optical system with improved optical properties. The embodiment provides an optical system capable of reducing the size. An embodiment provides a camera module having a pop-up structure.

Technical Solution

An optical system according to an embodiment of the invention comprises first to sixth lenses sequentially disposed along an optical axis from an object side toward an image-side, wherein the first lens has positive refractive power, an object-side surface of the first lens is convex, and the third lens has positive or negative refractive power and at least one of an object-side surface and an image-side surface of the third lens includes an inflection point, and the sixth lens has negative refractive power and at least one of an object-side surface and an image-side surface of the six lens includes an inflection point, and the following Equation may satisfy:

$$1 < TTL/BFL < 3 \quad \text{[Equation 1]}$$

(In Equation 1, TTL (Total track length) means a distance from an apex of the object-side surface of the first lens to an upper surface of the image sensor in a direction of the optical axis, and BFL (Back focal length) means a distance from an apex of the image-side surface of the sixth lens to the upper surface of the image sensor in the direction of the optical axis.).

According to an embodiment of the invention, an image-side surface of the first lens may be concave. The second lens may have negative refractive power and may have a meniscus shape convex toward the object side. The fourth lens may have negative refractive power, and the fifth lens may have positive refractive power. The fourth lens may have a meniscus shape convex to the image side.

The optical system may satisfy Equation 2 below:

$$1 < BFL/APE6 < 2 \quad \text{[Equation 2]}$$

(In Equation 2, APE6 means a distance in a direction perpendicular to the optical axis from the optical axis to an effective diameter of the image-side surface of the sixth lens.).

According to an embodiment of the invention, the optical system may satisfy the following Equation 3:

$$1.3 < Img/APE6 < 2 \quad \text{[Equation 3]}$$

(In Equation 3, Img means a value of ½ of a diagonal length of an effective region of the image sensor.).

A camera module according to an embodiment of the invention comprises the optical system and a driving member, and the driving member may control a position of a lens group including the first to sixth lenses according to whether the camera module is operated or not.

According to an embodiment of the invention, when the camera module is operated, the lens group is moved to a first position spaced apart from the image sensor by a first distance, and the optical system may have a first TTL defined as total track length (TTL) and a first BFL defined as a back focal length (BFL). When the camera module is not operated, the lens group moves to a second position spaced apart from the image sensor by a second distance smaller than the first distance, the optical system has a second TTL and a second BFL, the second TTL may be smaller than the first TTL, and the second BFL may be smaller than the first BFL.

Advantageous Effects

The optical system and the camera module according to the embodiment may have improved aberration characteristics and implement high image quality and high resolution. The optical system and the camera module according to the embodiment may control the TTL and BFL of the optical system by controlling the positions of a lens group including a plurality of lenses according to whether they are operated or not. In detail, when the camera module including the optical system is not operating, it may have a smaller total track length (TTL) and smaller back focal length (BFL) than when it is operating. Therefore, when the camera module does not operate, the overall length of the optical system may be reduced, so that the optical system and the camera module including the optical system may be provided more compactly.

BEST MODE

Figure 1:
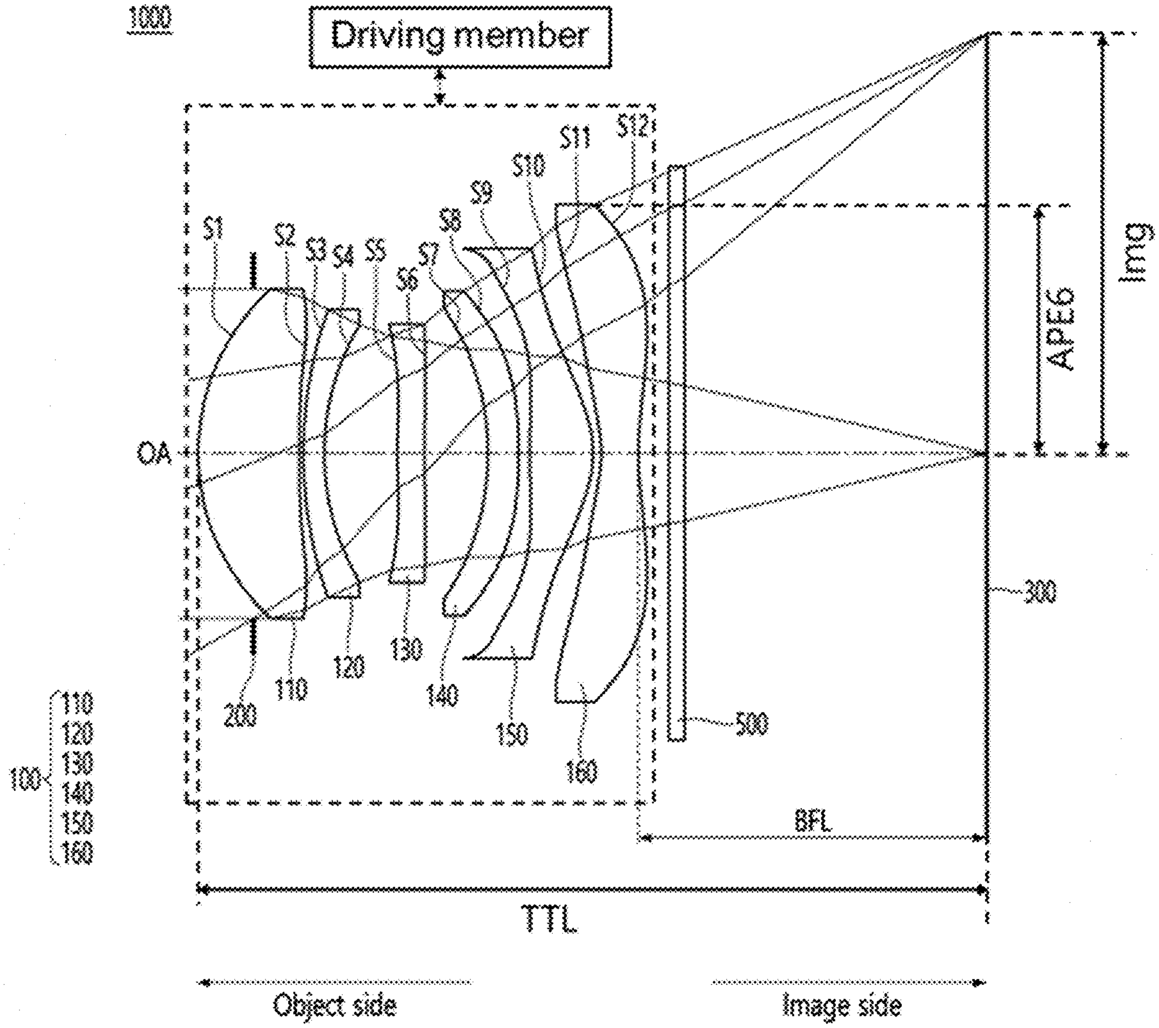
FIG. 1 is a configuration diagram of an optical system according to a first embodiment.

Hereinafter, preferred embodiments of the invention will be described in detail with reference to the accompanying drawings. A technical spirit of the invention is not limited to some embodiments to be described, and may be implemented in various other forms, and one or more of the components may be selectively combined and substituted for use within the scope of the technical spirit of the invention.

The terms (including technical and scientific terms) used in the embodiments of the invention, unless specifically defined and described explicitly, may be interpreted in a meaning that may be generally understood by those having ordinary skill in the art to which the invention pertains, and terms that are commonly used such as terms defined in a dictionary should be able to interpret their meanings in consideration of the contextual meaning of the relevant technology. Further, the terms used in the embodiments of the invention are for explaining the embodiments and are not intended to limit the invention. In this specification, the singular forms also may include plural forms unless otherwise specifically stated in a phrase, and in the case in which at least one (or one or more) of A and (and) B, C is stated, it may include one or more of all combinations that may be combined with A, B, and C. In describing the components of the embodiments of the invention, terms such as first, second, A, B, (a), and (b) may be used. Such terms are only for distinguishing the component from other component, and may not be determined by the term by the nature, sequence or procedure etc. of the corresponding constituent element. And when it is described that a component is “connected”, “coupled” or “joined” to another component, the description may include not only being directly connected, coupled or joined to the other component but also being “connected”, “coupled” or “joined” by another component between the component and the other component. In addition, in the case of being described as being formed or disposed “above (on)” or “below (under)” of each component, the description includes not only when two components are in direct contact with each other, but also when one or more other components are formed or disposed between the two components. In addition, when expressed as “above (on)” or “below (under)”, it may refer to a downward direction as well as an upward direction with respect to one element.

The convex surface of the lens may mean that the lens surface of the region corresponding to the optical axis has a convex shape, and the concave lens surface means that the lens surface of the region corresponding to the optical axis has a concave shape. In addition, “object-side surface” may mean the surface of the lens facing the object side with respect to the optical axis, and “image-side surface” may mean the surface of the lens toward the imaging surface with respect to the optical axis. In addition, the vertical direction may mean a direction perpendicular to the optical axis, and the end of the lens or the lens surface may mean the end of the effective region of the lens through which the incident light passes.

Figure 2A:
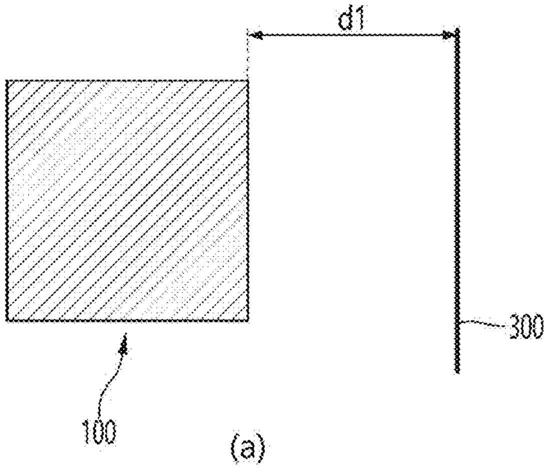
FIGS. 2A and 2B are diagrams for explaining changes in total track length (TTL) and back focal length (BFL) of the optical system according to the first embodiment.
Figure 2B:
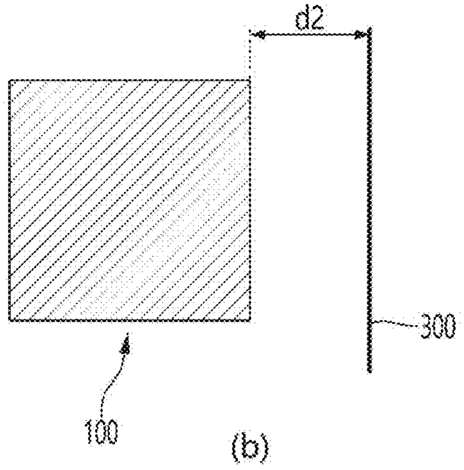

FIG. 1 is a configuration diagram of an optical system according to a first embodiment, and FIGS. 2A and 2B are diagrams for explaining changes in total track length (TTL) and back focal length (BFL) of the optical system according to the first embodiment.

Referring to FIGS. 1-2B, an optical system 1000 according to an embodiment may include a plurality of lenses 100. For example, the optical system 1000 according to the embodiment may include five or more lenses. In detail, the optical system 1000 may include six lenses. The optical system 1000 may include a first lens 110, a second lens 120, a third lens 130, a fourth lens 140, a fifth lens 150, a six lens 160, and an image sensor 300 sequentially disposed from an object side toward an image side. The first to sixth lenses 110, 120, 130, 140, 150, and 160 may be sequentially disposed along the optical axis OA of the optical system 1000.

Light corresponding to object information may pass through the first lens 110, the second lens 120, the third lens 130, the fourth lens 140, the fifth lens 150, and the sixth lens 160 and may incident on the image sensor 300. Each of the first to sixth lenses 110, 120, 130, 140, 150, and 160 may include an effective region and a non-effective region. The effective region may be a region through which light incident to each of the first to sixth lenses 110, 120, 130, 140, 150, and 160 passes. That is, the effective region may be a region in which the incident light is refracted to implement optical characteristics. The non-effective region may be arranged around the effective region. The non-effective region may be a region in which the light is not incident. That is, the non-effective region may be a region unrelated to the optical characteristics. Also, the non-effective region may be a region fixed to a barrel (not shown) accommodating the lens.

The optical system 1000 according to the embodiment may include an aperture stop 200. The aperture stop 200 may control the amount of light incident on the optical system 1000. The aperture stop 200 may be positioned in front of the first lens 110 or between two lenses selected from among the first to sixth lenses 110, 120, 130, 140, 150, and 160. For example, the aperture stop may be disposed between the second lens 120 and the third lens 130. In addition, at least one lens of the first to sixth lenses 110, 120, 130, 140, 150, and 160 may serve as an aperture stop. For example, an object-side surface or an image-side surface of one lens selected from among the first to sixth lenses 110, 120, 130, 140, 150, and 160 may serve as an aperture stop for adjusting the amount of light.

The first lens 110 may have positive (+) refractive power. The first lens 110 may include a plastic or glass material. For example, the first lens 110 may be made of a plastic material. The first lens 110 may include a first surface S1 defined as an object-side surface and a second surface S2 defined as an image-side surface. The first surface S1 may be convex, and the second surface S2 may be concave. That is, the first lens 110 may have a meniscus shape convex toward the object side. Alternatively, the first surface S1 may be convex and the second surface S2 may be convex. That is, the first lens 110 may have a convex shape on both sides. Alternatively, the first surface S1 may be concave, and the second surface S2 may be concave. That is, the first lens 110 may have a concave shape on both sides. Alternatively, the first surface S1 may be concave, and the second surface S2 may be convex. That is, the first lens 110 may have a meniscus shape convex on the image side. At least one of the first surface S1 and the second surface S2 may be an aspherical surface. For example, both the first surface S1 and the second surface S2 may be aspherical.

The second lens 120 may have negative (−) refractive power. The second lens 120 may include a plastic or glass material. For example, the second lens 120 may be made of a plastic material. The second lens 120 may include a third surface S3 defined as an object-side surface and a fourth surface S4 defined as an image-side surface. The third surface S3 may be convex, and the fourth surface S4 may be concave. That is, the second lens 120 may have a meniscus shape convex toward the object side. Alternatively, the third surface S3 may be convex and the fourth surface S4 may be convex. That is, the second lens 120 may have a convex shape on both sides. Alternatively, the third surface S3 may be concave, and the fourth surface S4 may be concave. That is, the second lens 120 may have a concave shape on both sides. Alternatively, the third surface S3 may be concave, and the fourth surface S4 may be convex. That is, the second lens 120 may have a meniscus shape convex toward the image side. At least one of the third and fourth surfaces S3 and S4 may be an aspherical surface. For example, both the third surface S3 and the fourth surface S4 may be aspheric surfaces.

The third lens 130 may have positive (+) or negative (−) refractive power. The third lens 130 may include a plastic or glass material. For example, the third lens 130 may be made of a plastic material. The third lens 130 may include a fifth surface S5 defined as an object-side surface and a sixth surface S6 defined as an image-side surface. The fifth surface S5 may be convex, and the sixth surface S6 may be concave. That is, the third lens 130 may have a meniscus shape convex toward the object side. Alternatively, the fifth surface S5 may be convex, and the sixth surface S6 may be convex. That is, the third lens 130 may have a convex shape on both sides. Alternatively, the fifth surface S5 may be concave, and the sixth surface S6 may be concave. That is, the third lens 130 may have a concave shape on both sides. Alternatively, the fifth surface S5 may be concave, and the sixth surface S6 may be convex. That is, the third lens 130 may have a meniscus shape convex toward the image side. At least one of the fifth surface S5 and the sixth surface S6 may be an aspherical surface. For example, both the fifth surface S5 and the sixth surface S6 may be aspheric surfaces. The third lens 130 may include at least one inflection point. In detail, at least one of the fifth surface S5 and the sixth surface S6 may include an inflection point. For example, the fifth surface S5 may include a first inflection point defined as an inflection point. The first inflection point may be disposed at a position less than or equal to about 90% when the starting point is the optical axis OA and an end of the fifth surface S5 of the third lens 130 is an ending point. Here, the end of the fifth surface S5 may mean the end of the effective region of the third lens 130, and the position of the first inflection point may be a position set based on the direction perpendicular of the optical axis OA.

The fourth lens 140 may have negative (−) refractive power. The fourth lens 140 may include a plastic or glass material. For example, the fourth lens 140 may be made of a plastic material. The fourth lens 140 may include a seventh surface S7 defined as an object-side surface and an eighth surface S8 defined as an image-side surface. The seventh surface S7 may be convex, and the eighth surface S8 may be concave. That is, the fourth lens 140 may have a meniscus shape convex toward the object side. Alternatively, the seventh surface S7 may be convex, and the eighth surface S8 may be convex. That is, the fourth lens 140 may have a convex shape on both sides. Alternatively, the seventh surface S7 may be concave, and the eighth surface S8 may be concave. That is, the fourth lens 140 may have a concave shape on both sides. Alternatively, the seventh surface S7 may be concave, and the eighth surface S8 may be convex. That is, the fourth lens 140 may have a meniscus shape convex toward the image side. At least one of the seventh surface S7 and the eighth surface S8 may be an aspherical surface. For example, both the seventh surface S7 and the eighth surface S8 may be aspheric surfaces.

The fifth lens 150 may have positive (+) refractive power. The fifth lens 150 may include a plastic or glass material. For example, the fifth lens 150 may be made of a plastic material. The fifth lens 150 may include a ninth surface S9 defined as an object-side surface and a tenth surface S10 defined as an image-side surface. The ninth surface S9 may be convex, and the tenth surface S10 may be concave. That is, the fifth lens 150 may have a meniscus shape convex toward the object side. Alternatively, the ninth surface S9 may be convex, and the tenth surface S10 may be convex. That is, the fifth lens 150 may have a convex shape on both sides. Alternatively, the ninth surface S9 may be concave, and the tenth surface S10 may be concave. That is, the fifth lens 150 may have a concave shape on both sides. Alternatively, the ninth surface S9 may be concave, and the tenth surface S10 may be convex. That is, the fifth lens 150 may have a meniscus shape convex toward the image side. At least one of the ninth surface S9 and the tenth surface S10 may be an aspherical surface. For example, both the ninth surface S9 and the tenth surface S10 may be aspheric surfaces.

The sixth lens 160 may have negative (−) refractive power. The sixth lens 160 may include a plastic or glass material. For example, the sixth lens 160 may be made of a plastic material. The sixth lens 160 may include an eleventh surface S 1*l* defined as an object-side surface and a twelfth surface S12 defined as an image-side surface. The eleventh surface S11 may be convex, and the twelfth surface S12 may be concave. That is, the sixth lens 160 may have a meniscus shape convex toward the object side. Alternatively, the eleventh surface S11 may be convex, and the twelfth surface S12 may be convex. That is, the sixth lens 160 may have a convex shape on both sides. Alternatively, the eleventh surface S11 may be concave, and the twelfth surface S12 may be concave. That is, the sixth lens 160 may have a concave shape on both sides. Alternatively, the eleventh surface S11 may be concave, and the twelfth surface S12 may be convex. That is, the sixth lens 160 may have a meniscus shape convex toward the image side. At least one of the eleventh surface S11 and the twelfth surface S12 may be an aspheric surface. For example, both the eleventh surface S11 and the twelfth surface S12 may be aspherical surfaces. The sixth lens 160 may include at least one inflection point. In detail, at least one of the eleventh surface S11 and the twelfth surface S12 may include an inflection point. For example, the twelfth surface S12 may include a second inflection point defined as an inflection point. The second point of inflection may be disposed at a position less than or equal to about 80% when the starting point is the optical axis OA and the end point of the twelfth surface S12 of the sixth lens 160 is the ending point. Here, the end of the twelfth surface S12 may mean the end of the effective region of the sixth lens 160, and the position of the second inflection point may be a position set based on the direction perpendicular to the optical axis OA.

The image sensor 300 may detect light. In detail, the image sensor 300 may detect light sequentially passing through the first to sixth lenses 110, 120, 130, 140, 150, and 160. The image sensor 300 may include a charge coupled device (CCD) or complementary metal oxide semiconductor (CMOS).

A filter 500 may be further disposed between the plurality of lenses 100 and the image sensor 300. The filter 500 may be disposed between the image sensor 300 and a last lens (e.g., sixth lens 160) closest to the image sensor 300 among the plurality of lenses 100. The filter 500 may include at least one of an infrared filter and an optical filter such as a cover glass. The filter 500 may pass light of a set wavelength band and filter light of a different wavelength band. When the filter 500 includes an infrared filter, radiant heat emitted from external light may be blocked from being transferred to the image sensor 300. In addition, the filter 500 may transmit visible light and reflect infrared light.

The optical system 1000 according to the embodiment may satisfy at least one of equations described below. Accordingly, the optical system 1000 according to the embodiment may have an optically improved effect.

$$1 < TTL/BFL < 3 \quad \text{[Equation 1]}$$

In Equation 1, TTL (Total track length) is a distance from an apex of the object-side surface (first surface S1) of the first lens 110 to an upper surface of the image sensor 300 in the direction of the optical axis OA. BFL (Back focal length) means a distance from an apex of the image-side surface (twelfth surface S12) of the sixth lens 160 to the upper surface of the image sensor 300 in the direction of the optical axis OA.

$$1 < F/BFL < 3 \quad \text{[Equation 2]}$$

In Equation 2, F means the total focal length of the optical system 1000, and BFL (Back focal length) means a distance from an apex of the image-side surface (twelfth surface S12) of the sixth lens 160 to the upper surface of the image sensor 300 in the direction of the optical axis OA.

$$0.5 < F/TTL < 1.5 \quad \text{[Equation 3]}$$

In Equation 3, F means the total focal length of the optical system 1000, and TTL (Total track length) means the distance from a apex of the object-side surface (first surface S1) of the first lens 110 to the upper surface of the image sensor 300 in the direction of the optical axis OA.

$$0.5 < BFL/Img < 1.5 \quad \text{[Equation 4]}$$

In Equation 4, BFL means the distance from the apex of the image-side surface (twelfth surface S12) of the sixth lens 160 to the upper surface of the image sensor 300 in the direction of the optical axis OA. In addition, Img means a vertical distance of the optical axis OA from the upper surface of the image sensor 300 overlapping the optical axis OA to a region of a 1.0 field of the image sensor 300. That is, Img means a value of ½ of the length of the effective region of the image sensor 300 in the diagonal direction.

$$0.5 < TTL/(Img \times 2) < 1.5 \quad \text{[Equation 5]}$$

In Equation 5, the total track length (TTL) means a distance from the apex of the object-side surface (first surface S1) of the first lens 110 to the upper surface of the image sensor 300 in the direction of the optical axis OA, and Img means a distance perpendicular to the optical axis OA from the upper surface of the image sensor 300 overlapping the optical axis OA to a region of a 1.0 field of the image sensor 300. That is, Img means a value of ½ of the length of the effective region of the image sensor 300 in the diagonal direction.

$$1 < BFL/APE6 < 2 \quad \text{[Equation 6]}$$

In Equation 6, Back focal length (BFL) means the distance from the apex of the image-side surface (twelfth surface S12) of the sixth lens 160 to the upper surface of the image sensor 300 in the direction of the optical axis OA. APE6 is a distance perpendicular to the optical axis OA from the optical axis OA to the effective diameter of the image-side surface (twelfth surface S12) of the sixth lens 160.

$$1.3 < Img/APE6 < 2 \quad \text{[Equation 7]}$$

In Equation 7, Img means a distance perpendicular to the optical axis OA from the upper surface of the image sensor 300 overlapping the optical axis OA to the region of the 1.0 field of the image sensor 300. That is, Img means a value of ½ of the length of the effective region of the image sensor 300 in the diagonal direction. Further, APE6 means a distance perpendicular to the optical axis OA from the optical axis OA to an effective diameter of the image-side surface (twelfth surface S12) of the sixth lens 160.

$$0 < L1R1/|L1R2| < 1 \quad \text{[Equation 8]}$$

In Equation 8, L1R1 means a radius of curvature of the object-side surface (first surface S1) of the first lens 110, and L1R2 means a radius of the curvature of the image-side surface (second surface S2) of the first lens 110.

$$1 < (L4R1) \times (L5R2) \quad \text{[Equation 9]}$$

In Equation 9, L4R1 means a radius of curvature of the object-side surface (seventh surface S7) of the fourth lens 140, and L5R2 means a radius of curvature of the image-side surface (tenth surface S10) of the fifth lens 150.

$$0.1 < G2 - G1 \quad \text{[Equation 10]}$$

In Equation 10, G1 means a refractive index of the first lens 110 for light in the 587 nm wavelength band, and G2 means a refractive index of the second lens 120 for light in the 587 nm wavelength band.

$$0.05 < G4 - G5 \quad \text{[Equation 11]}$$

In Equation 11, G4 means a refractive index of the fourth lens 140 for light in the 587 nm wavelength band, and G5 means a refractive index of the fifth lens 150 for light in the 587 nm wavelength band.

$$0.1 < f1/F < 2 \quad \text{[Equation 12]}$$

In Equation 12, F means the total focal length of the optical system 1000, and f1 means the focal length of the first lens 110.

$$0 < f1/|f3| < 1 \quad \text{[Equation 13]}$$

In Equation 13, f1 means the focal length of the first lens 110, and f3 means the focal length of the third lens 130.

$$0.1 < T1 - (T2 + T4) \quad \text{[Equation 14]}$$

In Equation 14, T1 means a center thickness of the first lens 110, T2 means the center thickness of the second lens 120, and T4 means a center thickness of the fourth lens 140.

$$|f3| > |f1| + |f2| + |f4| + |f5| + |f6| \quad \text{[Equation 15]}$$

In Equation 15, f1 to f6 means focal lengths of the first to sixth lenses 110, 120, 130, 140, 150, and 160, respectively.

$$Z = \frac{cY^2}{1 + \sqrt{1 - (1 + K)c^2Y^2}} + AY^4 + BY^6 + CY^8 + DY^{10} + EY^{12} + FY^{14} + \ldots \quad \text{[Equation 16]}$$

In Equation 16, Z is Sag and may mean a distance in the direction of the optical axis from an arbitrary position on the aspherical surface to the apex of the aspheric surface. Y may mean a distance in a direction perpendicular to the optical axis from an arbitrary position on the aspheric surface to the optical axis. c may mean the curvature of the lens, and K may mean the conic constant. Also, A, B, C, D, E, and F may mean aspheric constants.

In the optical system 1000 according to the embodiment, at least one lens may be provided to be movable in the direction of the optical axis OA. In detail, the distance between the sixth lens 160 and the image sensor 300 of the plurality of lenses 100 closest to the image sensor 300 may be changed by a driving member (not shown). That is, the back focal length (BFL) of the optical system 1000 may be changed by an applied control signal.

The distance between the first lens 110 of the plurality of lenses 100 closest to the object and the image sensor 300 may be changed by a driving member (not shown). That is, the total track length (TTL) of the optical system 1000 may be changed by an applied control signal. For example, the first to sixth lenses 110, 120, 130, 140, 150, and 160 may move by the driving force of the driving member. In detail, the plurality of lenses 100 may be defined as one lens group 100, and the lens group 100 may move in the direction of the optical axis OA by the driving force of the driving member. At this time, the first to sixth lenses 110, 120, 130, 140, 150, and 160 may simultaneously move in the direction of the optical axis OA without changing a distance between adjacent lenses. Accordingly, the BFL and TTL of the optical system 1000 may change. In this case, the lens group 100 may move from a first position spaced apart from the image sensor 300 by a first distance d1 to a second position spaced apart from the image sensor 300 by a second distance d2 smaller than the first distance d1. Here, the first position may be defined as an operating position, and the second position may be defined as a non-operating position. In addition, each of the first distance d1 and the second distance d2 may be the shortest distance between the image sensor 300 and the apex of the last lens (sixth lens 160) of the lens group 100. The second position may be closer to the image sensor 300 than the first position. In detail, in the distance in a direction of the optical axis OA between the sixth lens 160 and the image sensor 300, the distance when the lens group 100 is located at the second position may be smaller than that of when the lens group 100 is located at the first position. Also, in TTL of the optical system 1000, TTL when the lens group 100 is located at the second position may be smaller than that of when the lens group 100 is located at the first position.

In the optical system 1000 according to the embodiment, when the first to sixth lenses 110, 120, 130, 140, 150, and 160 move from the first position to the second position as one lens group 100, At least one of the equations described below may be further satisfied. Accordingly, the optical system 1000 may be provided more compactly.

$$3 < TTL'/BFL' < 6 \quad \text{[Equation 17]}$$

In Equation 17, TTL' means a distance in the direction of the optical axis OA from the apex of the object-side surface (first surface S1) of the first lens 110 to the upper surface of the image sensor 300 in the optical system moved from the first position to the second position, and BFL' means a distance in the direction of the optical axis OA from the apex of the image-side surface (twelfth surface (S12)) of the sixth lens 160 to the upper surface of the image sensor 300 in the optical system moved from the first position to the second position.

$$0.1 < BFL'/Img < 0.5 \quad \text{[Equation 18]}$$

In Equation 18, BFL'BFL' means a distance in the direction of the optical axis OA from the apex of the image-side surface (twelfth surface (S12)) of the sixth lens 160 to the upper surface of the image sensor 300 in the optical system moved from the first position to the second position. In addition, Img means a distance perpendicular to the optical axis OA from the upper surface of the image sensor 300 overlapping the optical axis OA to a region of a 1.0 field of the image sensor 300. That is, Img means a value of ½ of the length of the effective region of the image sensor 300 in the diagonal direction.

The optical system 1000 according to the embodiment may satisfy at least one of Equations 1 to 15. In this case, the optical system 1000 may have improved optical characteristics, improved aberration characteristics, and minimize the occurrence of optical distortion. The optical system 1000 according to the embodiment may further satisfy at least one of Equations 17 and 18. In this case, the optical system 1000 may control the TTL and BFL values of the optical system 1000 according to the applied signal, so that a device including the optical system 1000 may be provided slimmer and more compact.

Figure 3:
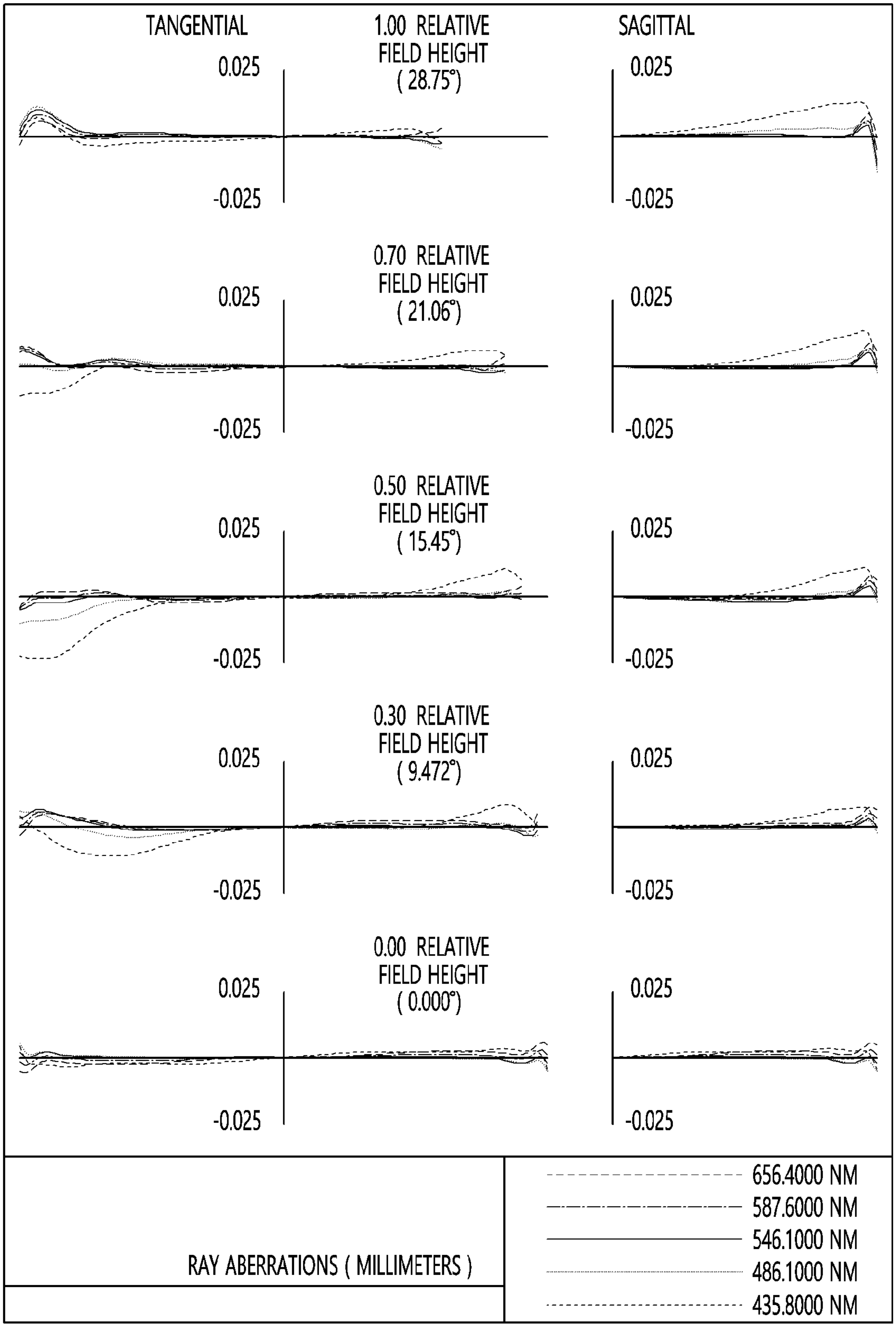
FIG. 3 is a graph showing MTF (Modulation Transfer Function) characteristics of the optical system according to the first embodiment.
Figure 4:
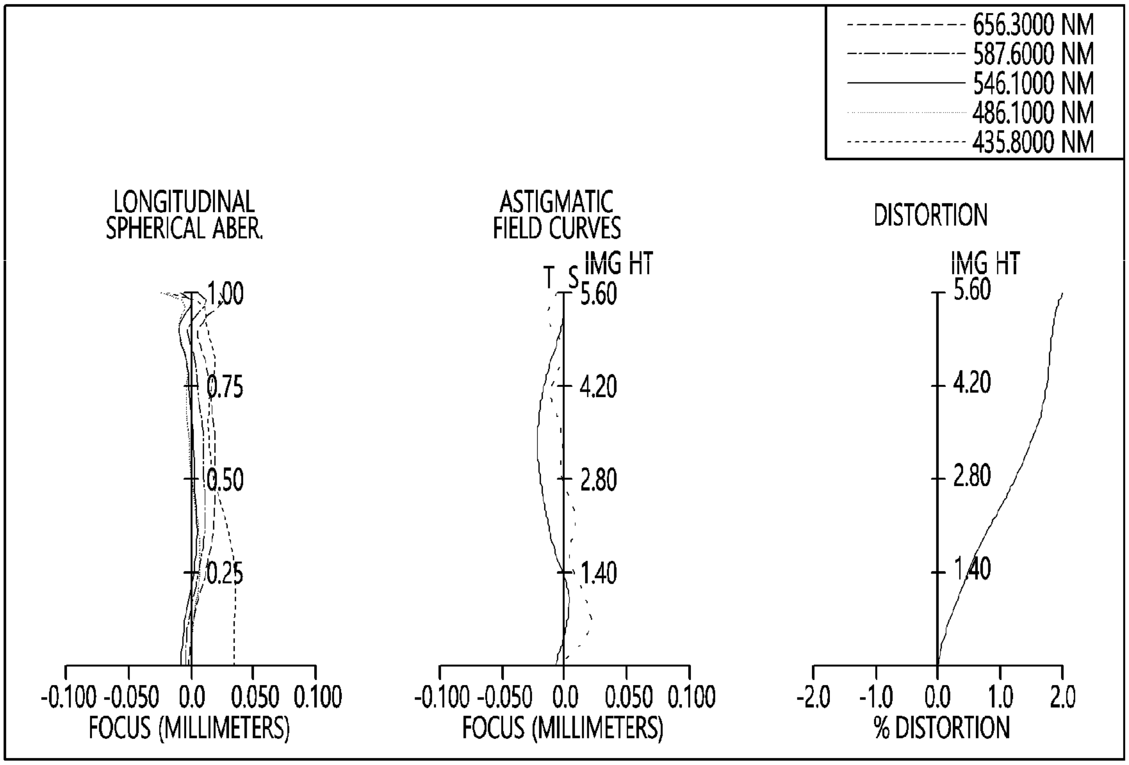
FIG. 4 is a graph showing aberration characteristics of the optical system according to the first embodiment.
Figure 5:
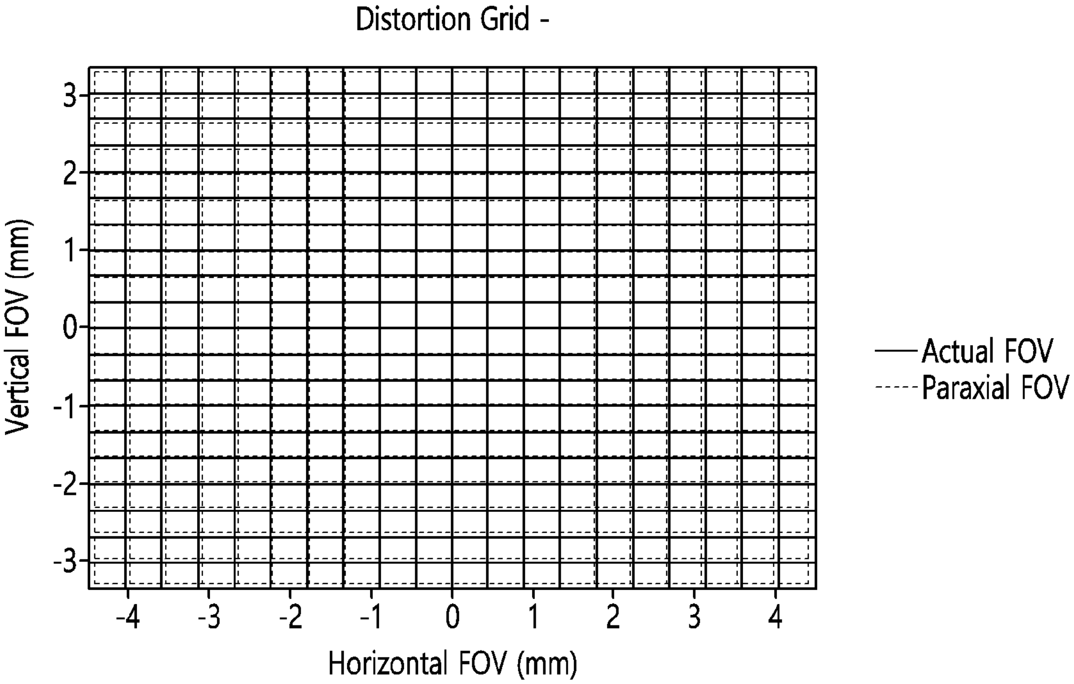
FIG. 5 is a diagram showing distortion characteristics of the optical system according to the first embodiment.

The optical system 1000 according to the first embodiment will be described in more detail with reference to FIGS. 1 to 5. FIGS. 3 to 5 are graphs showing MTF characteristics, aberration characteristics, and distortion characteristics of the optical system according to the first embodiment.

Referring to FIGS. 1-2B, the optical system 1000 according to the first embodiment may include a first lens 110, a second lens 120, a third lens 130, the fourth lens 140, the fifth lens 150, the sixth lens 160, and the image sensor 300 sequentially arranged from the object side toward the image side. The first to sixth lenses 110, 120, 130, 140, 150, and 160 may be sequentially disposed along the optical axis OA of the optical system 1000. The optical system 1000 according to the first embodiment may include an aperture stop 200. The aperture stop 200 may be disposed between the first lens 110 and an object. In addition, a filter 500 may be disposed between the plurality of lenses 100 and the image sensor 300. The filter 500 may be disposed between the sixth lens 160 and the image sensor 300.

TABLE 1

| Lens | Surface | Radius of curvature | Thickness (mm)/ Distance (mm) | Reflective Index | Abbe number |
|---|---|---|---|---|---|
| Stop | | Infinity | −0.727 | | |
| Lens 1 | S1 | 2.858 | 1.344 | 1.5343 | 55.656 |
| | S2 | 13.870 | 0.050 | | |
| Lens 2 | S3 | 4.577 | 0.280 | 1.6714 | 19.238 |
| | S4 | 3.069 | 0.981 | | |
| Lens 3 | S5 | 23.528 | 0.350 | 1.6398 | 23.265 |
| | S6 | 15.135 | 0.854 | | |
| Lens 4 | S7 | −3.086 | 0.400 | 1.6714 | 19.238 |
| | S8 | −15.429 | 0.143 | | |
| Lens S | S9 | 4.133 | 0.846 | 1.567 | 37.565 |
| | S10 | −1.436 | 0.115 | | |
| Lens 6 | S11 | −1.891 | 0.500 | 1.5343 | 55.656 |
| | S12 | 5.294 | 0.408 | | |
| Filter | S13 | Infinity | 0.210 | 1.5231 | 54.490 |
| Image sensor | S14 | Infinity | 4.019 | | |

Table 1 shows the radius of curvature, the thickness of each lens, and a distance between each of lenses, the refractive index, and Abbe number of the first to sixth lenses 110, 120, 130, 140, 150, and 160 according to the first embodiment. FIGS. 1-2B and Table 1, in the optical system 1000 according to the first embodiment, the first lens 110 may have positive (+) refractive power. The first surface S51 of the first lens 110 may be convex, and the second surface S2 may be concave. The first lens 110 may have a meniscus shape convex toward the object side. The first surface S1 may be an aspheric surface, and the second surface S2 may be an aspheric surface. The second lens 120 may have negative (−) refractive power. The third surface S3 of the second lens 120 may be convex, and the fourth surface S4 may be concave. The second lens 120 may have a meniscus shape convex toward the object side. The third surface S3 may be an aspherical surface, and the fourth surface S4 may be an aspheric surface. The third lens 130 may have negative (−) refractive power. The fifth surface S5 of the third lens 130 may be convex, and the sixth surface S6 may be concave. The third lens 130 may have a meniscus shape convex toward the object side. The fifth surface S5 may be an aspheric surface, and the sixth surface S6 may be an aspheric surface. The fourth lens 140 may have negative (−) refractive power. The seventh surface S7 of the fourth lens 140 may be concave, and the eighth surface S8 may be convex. The fourth lens 140 may have a meniscus shape convex to the image side. The seventh surface S7 may be an aspheric surface, and the eighth surface S8 may be an aspherical surface. The fifth lens 150 may have positive (+) refractive power. The ninth surface S9 of the fifth lens 150 may be convex, and the tenth surface S10 may be convex. Both surfaces of the fifth lens 150 may have a convex shape. The ninth surface S9 may be an aspheric surface, and the tenth surface S10 may be an aspherical surface. The sixth lens 160 may have negative (−) refractive power. The eleventh surface S11 of the sixth lens 160 may be concave, and the twelfth surface S12 may be concave. Both surfaces of the sixth lens 160 may have a concave shape. The eleventh surface S11 may be an aspheric surface, and the twelfth surface S12 may be an aspherical surface.

In the optical system 1000 according to the first embodiment, values of aspheric coefficients of each lens surface are shown in Table 2 below.

TABLE 2

| | S1 | S2 | S3 | S4 | S5 | S6 |
|---|---|---|---|---|---|---|
| K | 0.0522616 | 0 | 0 | −1.123275 | 0 | 0 |
| A | −5.98E−05 | −0.004798 | −0.017391 | −0.011206 | −0.019919 | −0.013372 |
| B | −0.00035 | 0.002069 | 0.0037092 | 0.0021051 | −0.007496 | −0.006806 |
| D | 0.0004486 | −0.000754 | −3.49E−05 | 0.0009411 | 0.006148 | 0.0060305 |
| E | −0.000436 | −3.33E−05 | −0.000573 | −0.000864 | −0.00369 | −0.003161 |
| F | 0.000241 | 7.37E−05 | 0.000292 | 0.0004054 | 0.0014795 | 0.0011841 |
| G | −8.08E−05 | −1.62E−05 | −5.27E−05 | −8.32E−05 | −0.000274 | −0.000217 |
| H | 1.55E−05 | 1.05E−06 | 3.44E−06 | 9.17E−06 | 1.89E−05 | 1.58E−05 |
| I | −1.57E−06 | 0 | 0 | 0 | 0 | 0 |
| J | 6.00E−08 | 0 | 0 | 0 | 0 | 0 |

| | S7 | S8 | S9 | S10 | S11 | S12 |
|---|---|---|---|---|---|---|
| K | 0 | 0 | −2.779736 | −6.148093 | −11.48029 | 0 |
| A | 0.0138004 | −0.116819 | 0.157334 | −0.031724 | 0.0173329 | −0.026913 |
| B | −0.003313 | 0.0961273 | 0.0925628 | 0.0245045 | 0.0020786 | 0.0022209 |
| D | −0.000826 | −0.065913 | −0.045753 | −0.00974 | −0.004782 | 0.0001965 |
| E | 0.0026223 | 0.0334823 | 0.0186585 | 0.0031952 | 0.0018821 | −0.000159 |
| F | −0.001856 | −0.011842 | −0.00567 | −0.000848 | −0.000395 | 3.70E−05 |
| G | 0.0006873 | 0.0027832 | 0.0011651 | 0.0001552 | 5.00E−05 | −4.90E−06 |
| H | −0.000146 | −0.000411 | −0.000151 | −1.75E−05 | −3.83E−06 | 3.88E−07 |
| I | 1.69E−05 | 3.43E−05 | 1.11E−05 | 1.09E−06 | 1.63E−07 | −1.73E−08 |
| J | −8.58E−07 | −1.23E−06 | −3.56E−07 | −2.85E−08 | −2.98E−09 | 3.36E−10 |

TABLE 3

| | First embodiment |
|---|---|
| BFL | 4.636 |
| F | 10.000 |
| TTL | 10.500 |
| Img | 5.6 |
| APE6 | 3.435 |
| f1 | 6.434 |
| f2 | −14.828 |
| f3 | −66.759 |
| f4 | −5.752 |
| f5 | 1.977 |
| f6 | −2.535 |
| BFL' | 1.636 |
| TTL' | 7.5 |

TABLE 4

| | Equation | First embodiment |
|---|---|---|
| Equation 1 | 1 < TTL/BFL < 3 | 2.265 |
| Equation 2 | 1 < F/BFL < 3 | 2.157 |
| Equation 3 | 0.5 < F/TTL < 1.5 | 0.952 |
| Equation 4 | 0.5 < BFL/Img < 1.5 | 0.828 |
| Equation 5 | 0.5 < TTL/(Img × 2) < 1.5 | 0.938 |
| Equation 6 | 1 < BFL/APE6 < 2 | 1.349 |
| Equation 7 | 1.3 < Img/APE6 < 2 | 1.630 |
| Equation 8 | 0 < L1R1/\|L1R2\| < 1 | 0.206 |
| Equation 9 | 1 < (L4R1) × (L5R2) | 4.431 |
| Equation 10 | 0.1 < G2 − G1 | 0.137 |
| Equation 11 | 0.05 < G4 − G5 | 0.104 |
| Equation 12 | 0.1 < f1/F < 2 | 0.643 |
| Equation 13 | 0 < f1/\|f3\| < 1 | 0.096 |
| Equation 14 | 0.1 < T1 − (T2 + T4) | 0.664 |
| Equation 15 | \|f3\| > \|f1\| + \|f2\| + \|f4\| + \|f5\| + \|f6\| | Satisfaction |
| Equation 17 | 3 < TTL'/BFL' < 6 | 4.584 |
| Equation 18 | 0.1 < BFL'/Img < 0.5 | 0.292 |

Table 3 shows the items of the above-mentioned equations in the optical system 1000 according to the first embodiment, and shows TTL (Total track length), BFL (Back focal length), F value, Img, focal lengths f1, f2, f3, f4, f5, and f6 of each of the first to sixth lenses 110, 120, 130, 140, 150, and 160 of the optical system 1000. Table 4 shows result values of Equations 1 to 15, Equations 17 and 18 in the optical system 1000 according to the first embodiment. Referring to Table 4, it may be seen that the optical system 1000 according to the first embodiment satisfies at least one of Equations 1 to 15. In detail, it may be seen that the optical system 1000 according to the first embodiment satisfies all of Equations 1 to 15 above. The optical system 1000 according to the first embodiment may have improved optical characteristics, and may have MTF (Modulation Transfer Function) characteristics, aberration characteristics, and distortion characteristics as shown in FIGS. 3 to 5. In detail, FIG. 4 is a measured graph of the aberration characteristics of the optical system 1000 according to the first embodiment, in which spherical aberration (Longitudinal spherical aberration), astigmatic field curves, and distortion are measured from left to right. In FIG. 4, X-axis may indicate a focal length (mm) or distortion (%), and Y-axis may indicate the height of an image. In addition, the graph for spherical aberration is a graph for light in a wavelength band of about 435 nm, about 486 nm, about 546 nm, about 587 nm, and about 656 nm, and the graph for astigmatism and distortion aberration is a graph for light in the wavelength band of 546 nm. It may be seen that the optical system 1000 satisfies Equations 17 and 18. In detail, the plurality of lenses 100 of the optical system 1000 may move from the first position to the second position as one lens group. Accordingly, the TTL and BFL values of the optical system 1000 may change.

In the first embodiment, TTL and BFL of the optical system 1000 may be controlled by controlling the position of the lens group 100 according to whether the optical system 1000 is operated. For example, when the operating the optical system 1000, the lens group 100 may be located at the first position. Accordingly, the optical system 1000 may acquire image information with set TTL and BFL values. Also, when the optical system 1000 is not operated, the lens group 100 may be located at the second position. In this case, the lens group 100 may be disposed closer to the image sensor 300, and the optical system 1000 may have TTL' and BFL' values smaller than TTL and BFL values at the first position. Therefore, the optical system 1000 according to the first embodiment may have improved optical characteristics when the optical system 1000 is operated, and minimizes the overall length of the optical system 1000 when the optical system 1000 is not operated. Thus, it may be provided more compactly.

Figure 6:
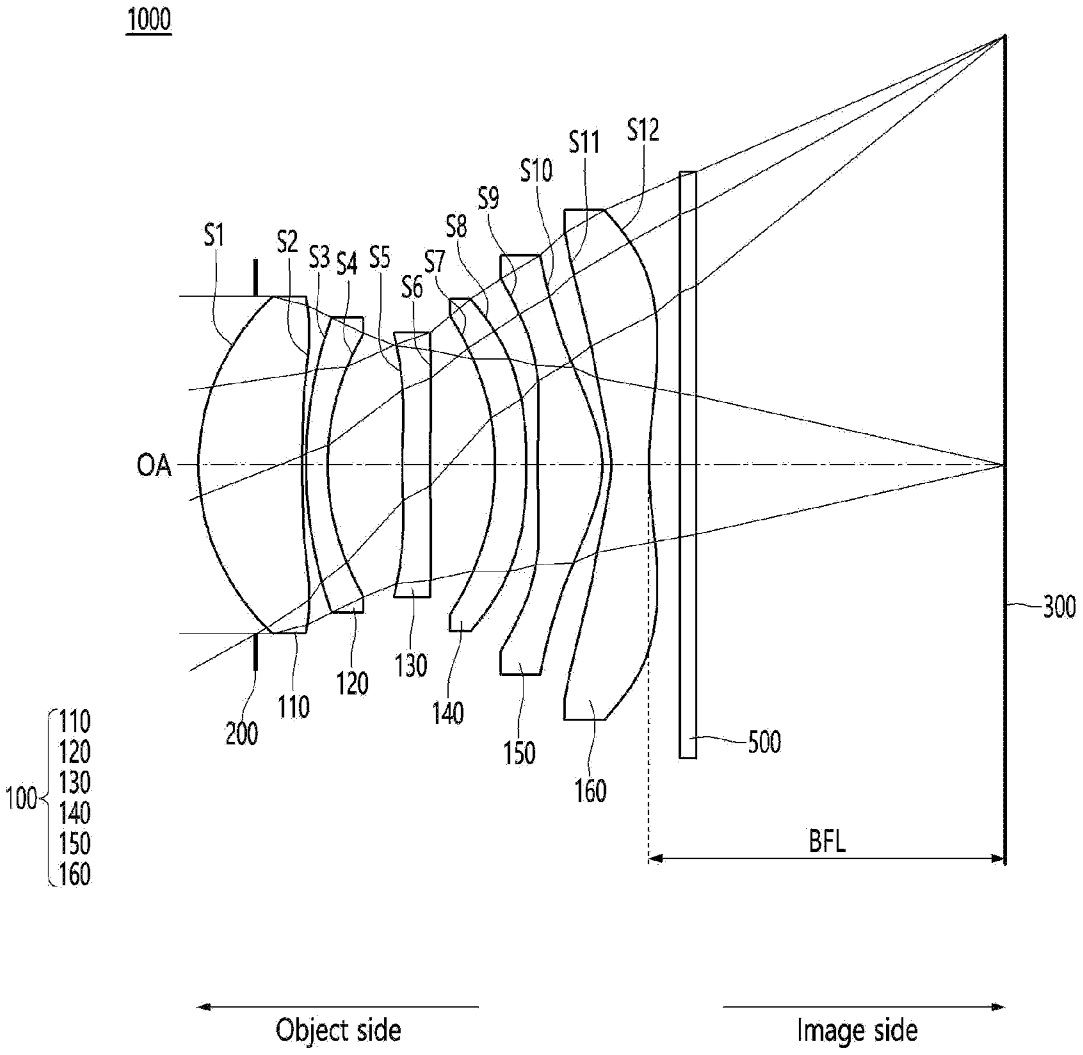
FIG. 6 is a configuration diagram of an optical system according to a second embodiment.
Figure 7A:
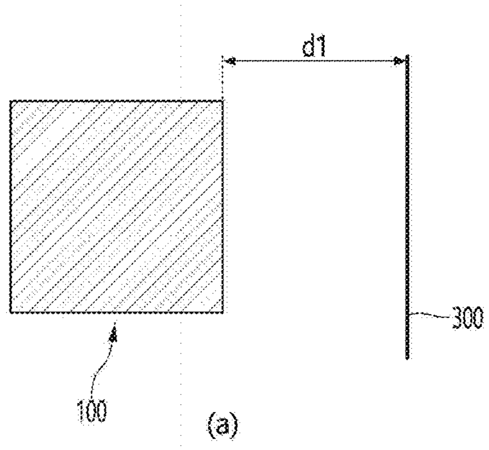
FIGS. 7A and 7B are diagrams for explaining TTL and BFL changes of an optical system according to a second embodiment.
Figure 7B:
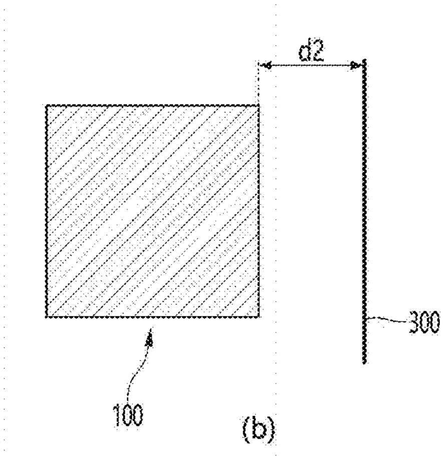
Figure 8:
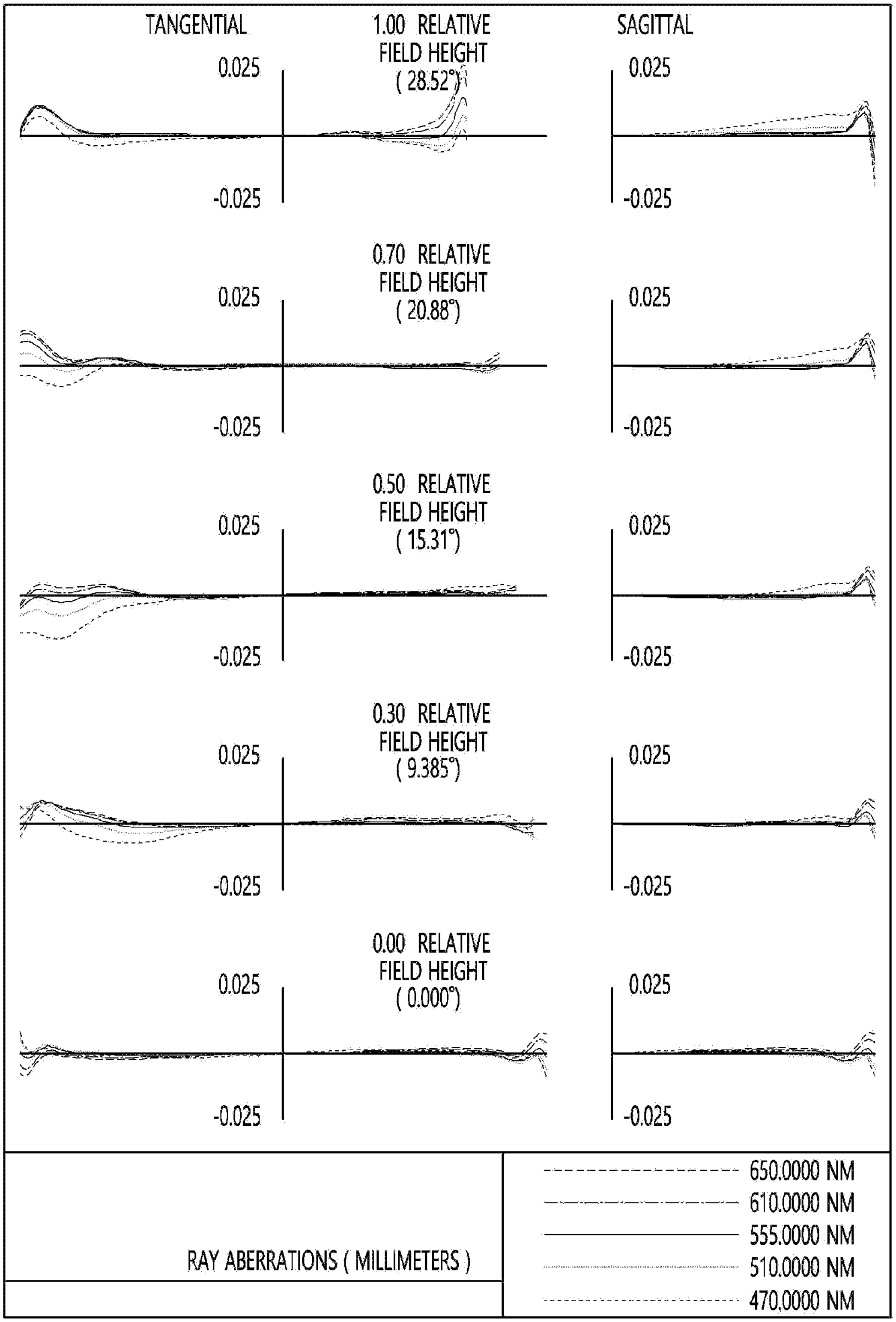
FIG. 8 is a graph showing MTF characteristics of an optical system according to the second embodiment.
Figure 9:
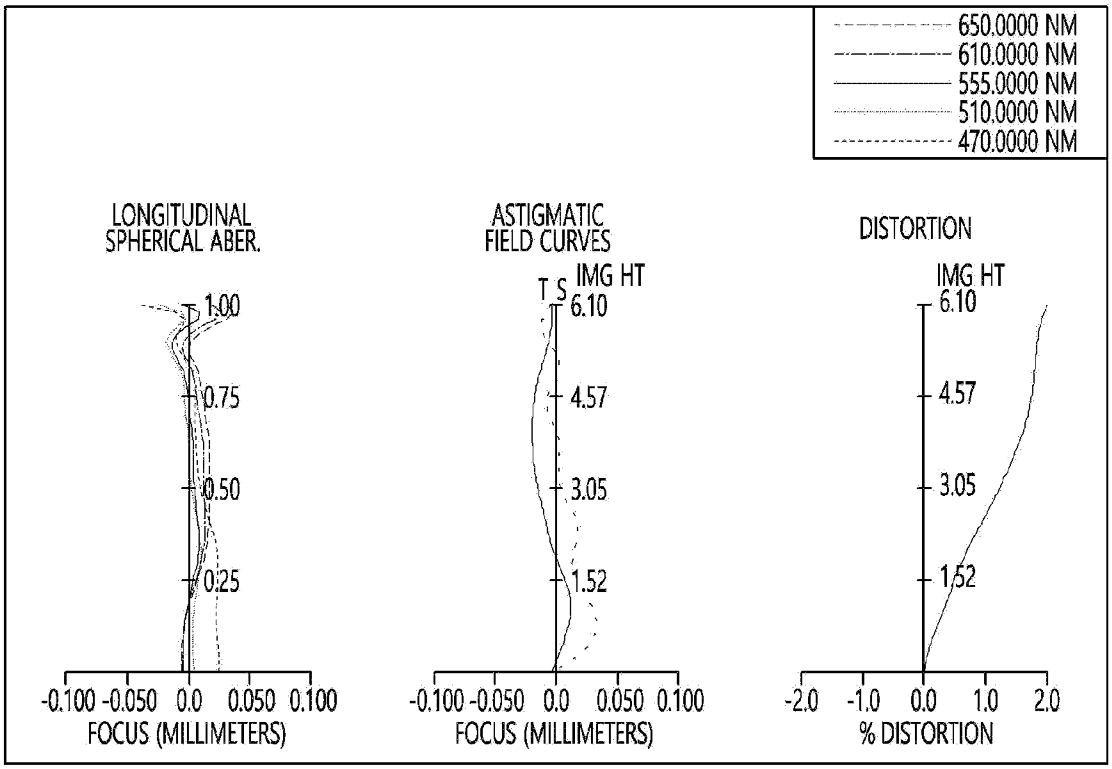
FIG. 9 is a graph showing aberration characteristics of an optical system according to the second embodiment.
Figure 10:
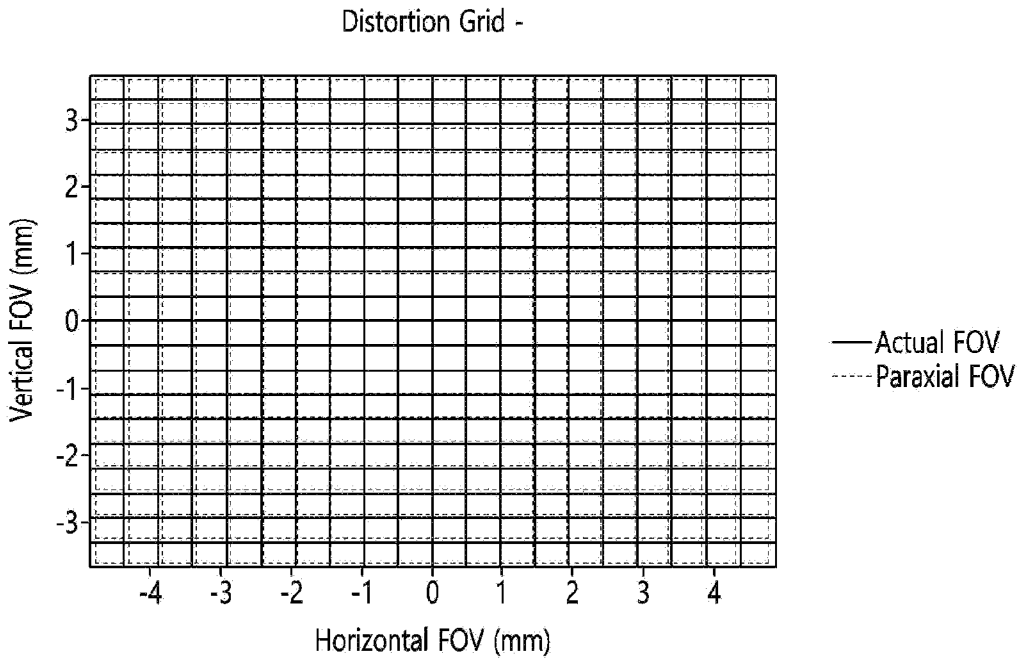
FIG. 10 is a diagram showing distortion characteristics of an optical system according to the second embodiment.

Referring to FIGS. 6 to 10, the optical system 1000 according to the second embodiment will be described in more detail. FIG. 6 is a configuration diagram of an optical system of an optical system according to a second embodiment, and FIGS. 7A and 7B are diagrams for explaining changes in total track length (TTL) and back focal length (BFL) of the optical system according to the second embodiment. In addition, FIGS. 8 to 10 are graphs showing MTF characteristics, aberration characteristics, and distortion characteristics of the optical system according to the second embodiment.

Referring to FIGS. 6-7B, the optical system 1000 according to the second embodiment may include a first lens 110, a second lens 120, a third lens 130, the fourth lens 140, the fifth lens 150, the sixth lens 160, and the image sensor 300 sequentially arranged from the object side toward the image side. The first to sixth lenses 110, 120, 130, 140, 150, and 160 may be sequentially arranged along the optical axis of the optical system 1000.

The optical system 1000 according to the second embodiment may include the aperture stop 200. The aperture stop 200 may be disposed between the first lens 110 and an object. In addition, a filter 500 may be disposed between the plurality of lenses 100 and the image sensor 300. The filter 500 may be disposed between the sixth lens 160 and the image sensor 300.

TABLE 5

| Lens | Surface | Radius of curvature | Thickness (mm)/ Distance (mm) | Reflective Index | Abbe number |
|---|---|---|---|---|---|
| Stop | | Infinity | −0.792 | | |
| Lens 1 | S1 | 3.115 | 1.486 | 1.5343 | 55.656 |
| | S2 | 18.970 | 0.050 | | |
| Lens 2 | S3 | 5.482 | 0.305 | 1.6714 | 19.238 |
| | S4 | 3.349 | 1.075 | | |
| Lens 3 | S5 | 17.723 | 0.404 | 1.5343 | 55.656 |
| | S6 | 14.114 | 0.919 | | |
| Lens 4 | S7 | −3.358 | 0.443 | 1.6714 | 19.238 |
| | S8 | −17.782 | 0.155 | | |
| Lens 5 | S9 | 4.357 | 0.886 | 1.567 | 37.565 |
| | S10 | −1.568 | 0.121 | | |
| Lens 6 | S11 | −2.037 | 0.514 | 1.5343 | 55.656 |
| | S12 | 5.820 | 0.444 | | |
| Filter | S13 | Infinity | 0.210 | 1.5231 | 54.490 |
| Image sensor | S14 | Infinity | 4.487 | | |

Table 5 shows the radius of curvature, the thickness of each lens, and a distance between each of lenses, the refractive index, and Abbe number of the first to sixth lenses 110, 120, 130, 140, 150, and 160 according to the second embodiment.

Referring to FIGS. 6-7B and Table 5, in the optical system 1000 according to the second embodiment, the first lens 110 may have positive (+) refractive power. The first surface S1 of the first lens 110 may be convex, and the second surface S2 may be concave. The first lens 110 may have a meniscus shape convex toward the object side. The first surface S1 may be an aspheric surface, and the second surface S2 may be an aspheric surface. The second lens 120 may have negative (−) refractive power. The third surface S3 of the second lens 120 may be convex, and the fourth surface S4 may be concave. The second lens 120 may have a meniscus shape convex toward the object side. The third surface S3 may be an aspherical surface, and the fourth surface S4 may be an aspheric surface. The third lens 130 may have negative (−) refractive power. The fifth surface S5 of the third lens 130 may be convex, and the sixth surface S6 may be concave. The third lens 130 may have a meniscus shape convex toward the object side. The fifth surface S5 may be an aspheric surface, and the sixth surface S6 may be an aspheric surface. The fourth lens 140 may have negative (−) refractive power. The seventh surface S7 of the fourth lens 140 may be concave, and the eighth surface S8 may be convex. The fourth lens 140 may have a meniscus shape convex toward the image side. The seventh surface S7 may be an aspheric surface, and the eighth surface S8 may be an aspherical surface. The fifth lens 150 may have positive (+) refractive power. The ninth surface S9 of the fifth lens 150 may be convex, and the tenth surface S10 may be convex. Both surfaces of the fifth lens 150 may have a convex shape. The ninth surface S9 may be an aspheric surface, and the tenth surface S10 may be an aspherical surface. The sixth lens 160 may have negative (−) refractive power. The eleventh surface S11 of the sixth lens 160 may be concave, and the twelfth surface S12 may be concave. Both surfaces of the sixth lens 160 may have a concave shape. The eleventh surface S11 may be an aspheric surface, and the twelfth surface S12 may be an aspherical surface.

In the optical system 1000 according to the second embodiment, values of aspheric coefficients of each lens surface are shown in Table 6 below.

TABLE 6

| | S1 | S2 | S3 | S4 | S5 | S6 |
|---|---|---|---|---|---|---|
| K | 0.046381908 | 0 | 0 | −0.98149433 | 0 | 0 |
| A | 0.000143378 | −0.00244845 | −0.01273479 | −0.00892919 | −0.0135381 | −0.00872241 |
| B | −0.00066529 | 0.000214082 | 0.001545415 | 0.001761674 | −0.00537051 | −0.0059172 |
| D | 0.000799753 | −0.00013306 | 8.20E−05 | 9.76E−05 | 0.003560648 | 0.004269246 |
| E | −0.00058769 | −1.65E−05 | −0.00019381 | −0.00013644 | −0.00186887 | −0.00212046 |
| F | 0.000255937 | 1.74E−05 | 9.37E−05 | 8.71E−05 | 0.000634867 | 0.000686197 |
| G | −6.84E−05 | −3.41E−06 | −1.62E−05 | −1.71E−05 | −9.78E−05 | −0.00010807 |
| H | 1.08E−05 | 1.90E−07 | 1.01E−06 | 1.87E−06 | 5.70E−06 | 6.77E−06 |
| I | −9.28E−07 | 0 | 0 | 0 | 0 | 0 |
| J | 3.24E−08 | 0 | 0 | 0 | 0 | 0 |

TABLE 6-continued

| | S7 | S8 | S9 | S10 | S11 | S12 |
|---|---|---|---|---|---|---|
| K | 0 | 0 | −2.91888087 | −6.29906879 | −11.3467528 | 0 |
| A | 0.010629187 | −0.08914484 | −0.11997467 | −0.02691704 | 0.00988836 | −0.02106639 |
| B | −0.00106217 | 0.062891248 | 0.058240752 | 0.017801583 | 0.004835096 | 0.001512609 |
| D | −0.00261445 | −0.03704833 | −0.02405694 | −0.00622822 | −0.00422249 | 9.72E−05 |
| E | 0.003237134 | 0.016325642 | 0.008425136 | 0.001822405 | 0.001305575 | −7.49E−05 |
| F | −0.00183686 | −0.00503812 | −0.00222717 | −0.00042723 | −0.00022878 | 1.52E−05 |
| G | 0.000587729 | 0.00103419 | 0.000397471 | 6.78E−05 | 2.46E−05 | −1.76E−06 |
| H | −0.00010881 | −0.00013315 | −4.45E−05 | −6.53E−06 | −1.61E−06 | 1.21E−07 |
| I | 1.09E−05 | 9.65E−06 | 2.82E−06 | 3.44E−07 | 5.83E−08 | −4.69E−09 |
| J | −4.69E−07 | −2.99E−07 | −7.75E−08 | −7.58E−09 | −9.03E−10 | 7.96E−11 |

TABLE 7

| | Second embodiment |
|---|---|
| BFL | 5.141 |
| F | 11.000 |
| TTL | 11.498 |
| Img | 6.1 |
| APE6 | 3.684 |
| f1 | 6.732 |
| f2 | −13.480 |
| f3 | −134.549 |
| f4 | −6.186 |
| f5 | 2.140 |
| f6 | −2.752 |
| BFL' | 2.141 |
| TTL' | 8.498 |

TABLE 8

| | Equation | Second embodiment |
|---|---|---|
| Equation 1 | 1 < TTL/BFL < 3 | 2.237 |
| Equation 2 | 1 < F/BFL < 3 | 2.140 |
| Equation 3 | 0.5 < F/TTL < 1.5 | 0.957 |
| Equation 4 | 0.5 < BFL/Img < 1.5 | 0.843 |
| Equation 5 | 0.5 < TTL/(Img × 2) < 1.5 | 0.942 |
| Equation 6 | 1 < BFL/APE6 < 2 | 1.395 |
| Equation 7 | 1.3 < Img/APE6 < 2 | 1.656 |
| Equation 8 | 0 < L1R1/\|L1R2\| < 1 | 0.164 |
| Equation 9 | 1 < (L4R1) × (L5R2) | 5.267 |
| Equation 10 | 0.1 < G2 − G1 | 0.137 |
| Equation 11 | 0.05 < G4 − G5 | 0.104 |
| Equation 12 | 0.1 < f1/F < 2 | 0.612 |
| Equation 13 | 0 < f1/\|f3\| < 1 | 0.050 |
| Equation 14 | 0.1 < T1 − (T2 + T4) | 0.737 |
| Equation 15 | \|f3\| > \|f1\| + \|f2\| + \|f4\| + \|f5\| + \|f6\| | Satisfaction |
| Equation 17 | 3 < TTL'/BFL' < 6 | 3.969 |
| Equation 18 | 0.1 < BFL'/Img < 0.5 | 0.351 |

Table 7 shows the items of the above-mentioned equations in the optical system 1000 according to the second embodiment, and shows TTL (Total track length), BFL (Back focal length), F value, Img, focal lengths f1, f2, f3, f4, f5, and f6 of each of the first to sixth lenses 110, 120, 130, 140, 150, and 160 of the optical system 1000. Table 8 shows result values of Equations 1 to 15, Equations 17 and 18 in the optical system 1000 according to the second embodiment. Referring to Table 8, it may be seen that the optical system 1000 according to the second embodiment satisfies at least one of Equations 1 to 15. In detail, it may be seen that the optical system 1000 according to the second embodiment satisfies all of Equations 1 to 15 above. The optical system 1000 according to the second embodiment may have improved optical characteristics, and may have modulation transfer function (MTF) characteristics, aberration characteristics, and distortion characteristics as shown in FIGS. 8 to 10. In detail, FIG. 9 is a measured graph of the aberration characteristics of the optical system 1000 according to the first embodiment, in which spherical aberration (Longitudinal spherical aberration), astigmatic field curves, and distortion are measured from left to right. In FIG. 9, X-axis may indicate a focal length (mm) or distortion (%), and Y-axis may indicate the height of an image. In addition, the graph for spherical aberration is a graph for light in a wavelength band of about 435 nm, about 486 nm, about 546 nm, about 587 nm, and about 656 nm, and the graph for astigmatism and distortion aberration is a graph for light in the wavelength band of 546 nm. It may be seen that the optical system 1000 satisfies Equations 17 and 18. In detail, the plurality of lenses 100 of the optical system 1000 may move from the first position to the second position as one lens group. Accordingly, the TTL and BFL values of the optical system 1000 may change.

In the second embodiment, TTL and BFL of the optical system 1000 may be controlled by controlling the position of the lens group 100 according to whether the optical system 1000 is operated. For example, when the operating the optical system 1000, the lens group 100 may be located at the first position. Accordingly, the optical system 1000 may acquire image information with set TTL and BFL values. Also, when the optical system 1000 is not operated, the lens group 100 may be located at the second position. In this case, the lens group 100 may be disposed closer to the image sensor 300, and the optical system 1000 may have TTL' and BFL' values smaller than TTL and BFL values at the first position. Therefore, the optical system 1000 according to the second embodiment may have improved optical characteristics when the optical system 1000 is operated, and minimizes the overall length of the optical system 1000 when the optical system 1000 is not operated. Thus, it may be provided more compactly.

Figure 11:
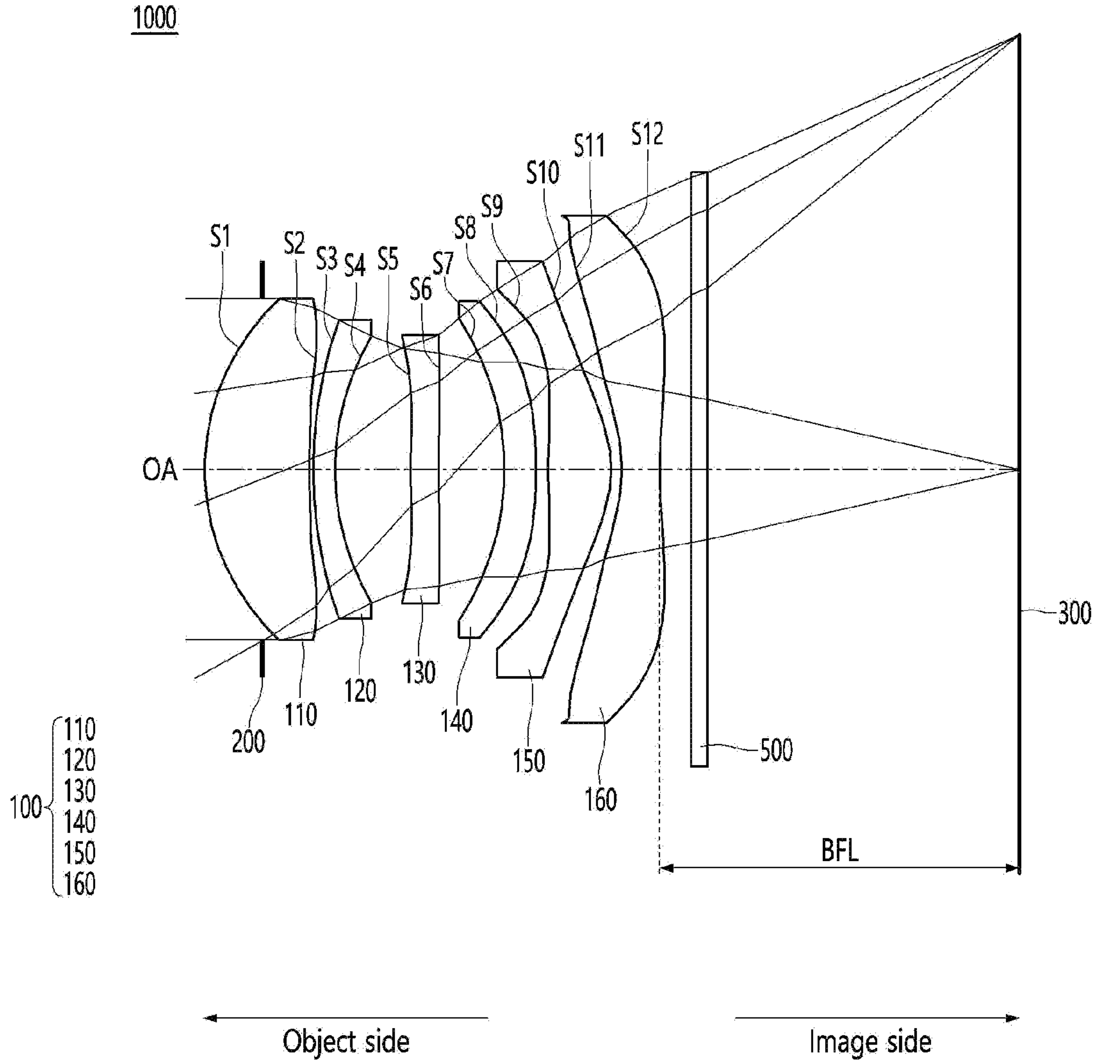
FIG. 11 is a configuration diagram of an optical system according to a third embodiment.
Figure 12A:
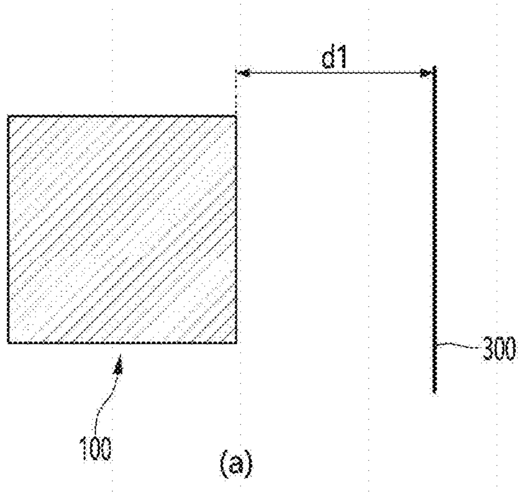
FIGS. 12A and 12B are diagrams for explaining TTL and BFL changes of an optical system according to the third embodiment.
Figure 12B:
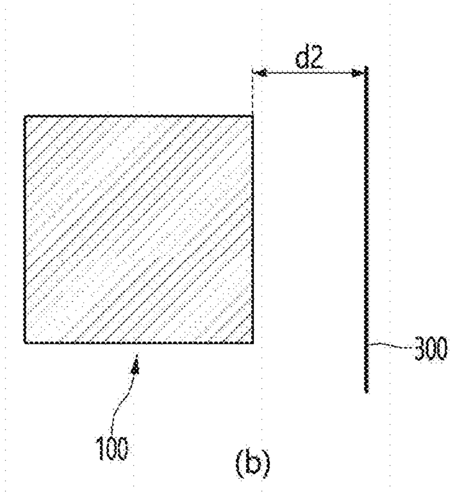
Figure 13:
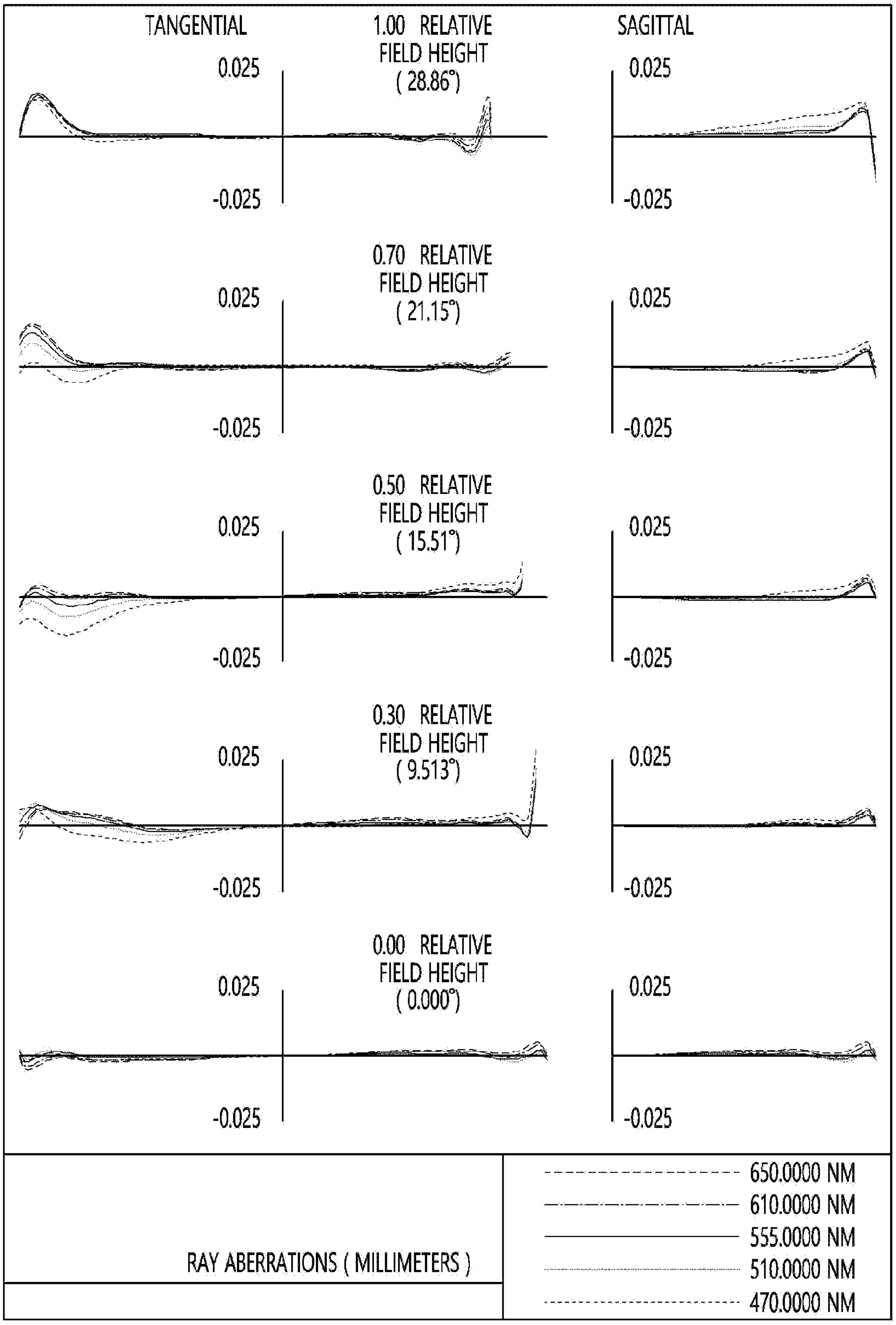
FIG. 13 is a graph showing MTF characteristics of an optical system according to the third embodiment.
Figure 14:
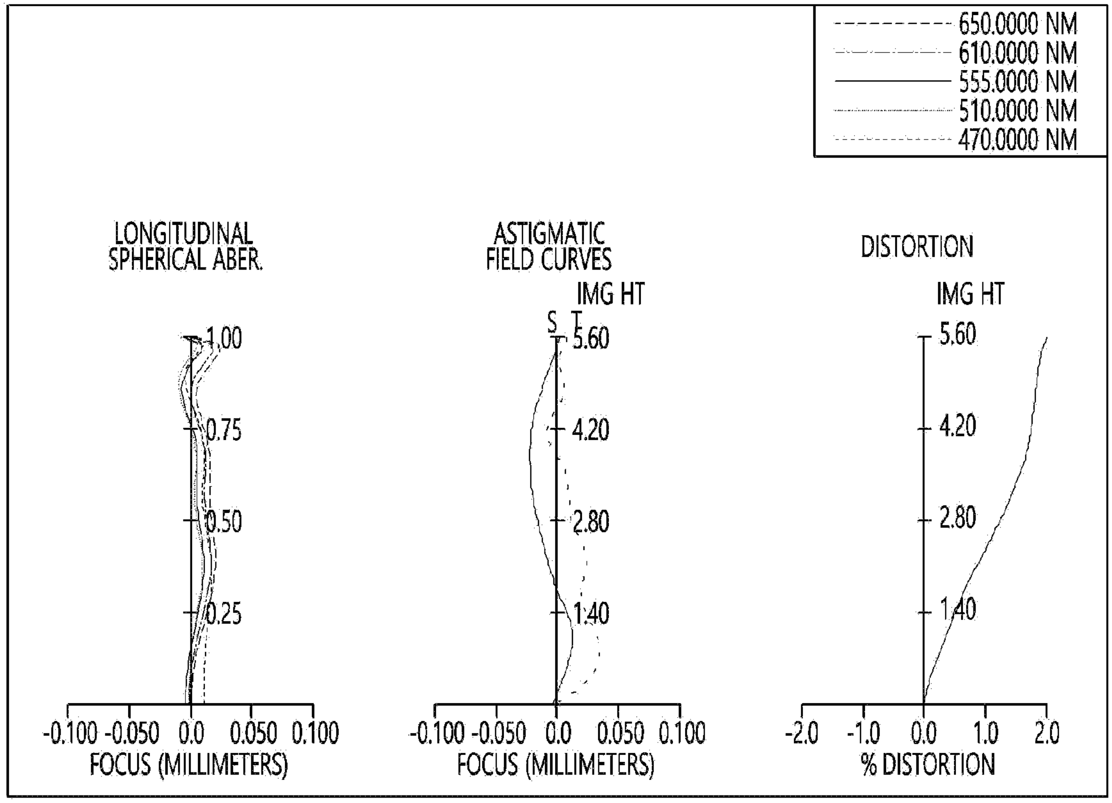
FIG. 14 is a graph showing aberration characteristics of an optical system according to the third embodiment.
Figure 15:
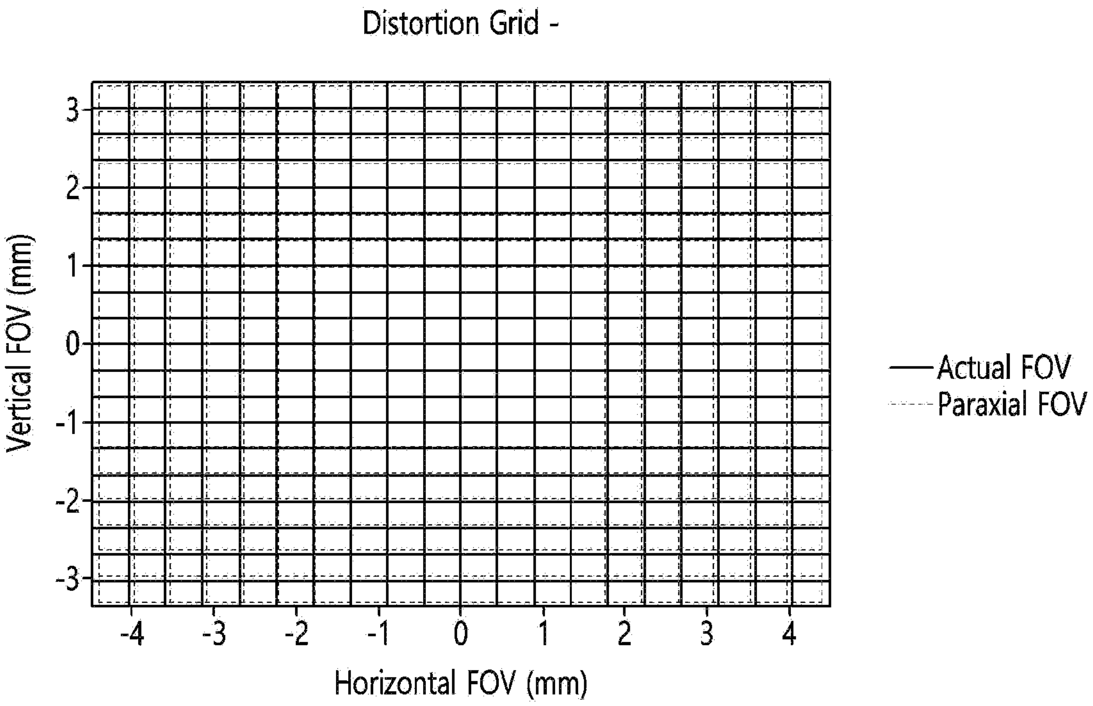
FIG. 15 is a diagram showing distortion characteristics of an optical system according to the third embodiment.

Referring to FIGS. 11 to 15, the optical system 1000 according to the third embodiment will be described in more detail. FIG. 11 is a configuration diagram of an optical system of an optical system according to a third embodiment, and FIGS. 12A and 12B are diagrams for explaining changes in total track length (TTL) and back focal length (BFL) of the optical system according to the third embodiment. In addition, FIGS. 13 to 15 are graphs showing MTF characteristics, aberration characteristics, and distortion characteristics of the optical system according to the third embodiment.

Referring to FIGS. 11-12B, the optical system 1000 according to the third embodiment may include a first lens 110, a second lens 120, a third lens 130, the fourth lens 140, the fifth lens 150, the sixth lens 160, and the image sensor 300 sequentially arranged from the object side toward the image side. The first to sixth lenses 110, 120, 130, 140, 150, and 160 may be sequentially arranged along the optical axis of the optical system 1000. The optical system 1000 according to the third embodiment may include the aperture stop 200. The aperture stop 200 may be disposed between the first lens 110 and an object. In addition, a filter 500 may be disposed between the plurality of lenses 100 and the image sensor 300. The filter 500 may be disposed between the sixth lens 160 and the image sensor 300.

TABLE 9

| Lens | Surface | Radius of curvature | Thickness (mm)/ Distance (mm) | Reflective Index | Abbe number |
|---|---|---|---|---|---|
| Stop | | Infinity | −0.727 | | |
| Lens 1 | S1 | 2.874 | 1.302 | 1.5343 | 55.656 |
| | S2 | 14.836 | 0.050 | | |
| Lens 2 | S3 | 5.355 | 0.340 | 1.6714 | 19.238 |
| | S4 | 3.216 | 0.772 | | |
| Lens 3 | S5 | 20.517 | 0.556 | 1.567 | 37.565 |
| | S6 | 29.654 | 0.850 | | |
| Lens 4 | S7 | −3.167 | 0.400 | 1.6714 | 19.238 |
| | S8 | −10.240 | 0.170 | | |
| Lens 5 | S9 | 5.158 | 0.819 | 1.567 | 37.565 |
| | S10 | −1.637 | 0.144 | | |
| Lens 6 | S11 | −1.903 | 0.500 | 1.5343 | 55.656 |
| | S12 | 8.431 | 0.408 | | |
| Filter | S13 | Infinity | 0.210 | 1.5231 | 54.490 |
| Image sensor | S14 | Infinity | 3.979 | | |

Table 9 shows the radius of curvature, the thickness of each lens, and a distance between each of lenses, the refractive index, and Abbe number of the first to sixth lenses 110, 120, 130, 140, 150, and 160 according to the third embodiment. Referring to FIGS. 11-12B and Table 9, in the optical system 1000 according to the third embodiment, the first lens 110 may have positive (+) refractive power. The first surface S1 of the first lens 110 may be convex, and the second surface S2 may be concave. The first lens 110 may have a meniscus shape convex toward the object side. The first surface S1 may be an aspheric surface, and the second surface S2 may be an aspheric surface. The second lens 120 may have negative (−) refractive power. The third surface S3 of the second lens 120 may be convex, and the fourth surface S4 may be concave. The second lens 120 may have a meniscus shape convex toward the object side. The third surface S3 may be an aspherical surface, and the fourth surface S4 may be an aspheric surface. The third lens 130 may have positive (+) refractive power. The fifth surface S5 of the third lens 130 may be convex, and the sixth surface S6 may be concave. The third lens 130 may have a meniscus shape convex toward the object side. The fifth surface S5 may be an aspheric surface, and the sixth surface S6 may be an aspheric surface. The fourth lens 140 may have negative (−) refractive power. The seventh surface S7 of the fourth lens 140 may be concave, and the eighth surface S8 may be convex. The fourth lens 140 may have a meniscus shape convex toward the image side. The seventh surface S7 may be an aspheric surface, and the eighth surface S8 may be an aspherical surface. The fifth lens 150 may have positive (+) refractive power. The ninth surface S9 of the fifth lens 150 may be convex, and the tenth surface S1 may be convex. Both surfaces of the fifth lens 150 may have a convex shape. The ninth surface S9 may be an aspheric surface, and the tenth surface S1 may be an aspherical surface. The sixth lens 160 may have negative (−) refractive power. The eleventh surface S11 of the sixth lens 160 may be concave, and the twelfth surface S12 may be concave. Both surfaces of the sixth lens 160 may have a concave shape. The eleventh surface S11 may be an aspheric surface, and the twelfth surface S 12 may be an aspherical surface.

In the optical system 1000 according to the third embodiment, values of aspheric coefficients of each lens surface are shown in Table 10 below.

TABLE 10

| | S1 | S2 | S3 | S4 | S5 | S6 |
|---|---|---|---|---|---|---|
| K | 0.0480038 | 0 | 0 | −0.715905 | 0 | 0 |
| A | −7.85E−05 | 0.0013994 | −0.006251 | −0.006136 | −0.013117 | −0.008735 |
| B | −0.000273 | −0.008389 | −0.008233 | −0.000882 | −0.003792 | −0.00583 |
| D | 0.0001605 | 0.0064487 | 0.0069945 | 0.0004186 | 0.0008546 | 0.0042627 |
| E | −4.95E−05 | −0.002812 | −0.002828 | 0.0008413 | −0.000129 | −0.00268 |
| F | −3.28E−05 | 0.000698 | 0.0006591 | −0.000525 | −4.06E−05 | 0.0010559 |
| G | 3.02E−05 | −9.09E−05 | −7.06E−05 | 0.0001355 | 4.89E−05 | −0.000204 |
| H | −1.05E−05 | 4.66E−06 | 1.95E−06 | −8.69E−06 | −4.13E−06 | 1.68E−05 |
| I | 1.71E−06 | 0 | 0 | 0 | 0 | 0 |
| J | −1.11E−07 | 0 | 0 | 0 | 0 | 0 |

| | S7 | S8 | S9 | S10 | S11 | S12 |
|---|---|---|---|---|---|---|
| K | 0 | 0 | −3.92451 | −6.643618 | −9.176305 | 0 |
| A | 0.0148376 | −0.068349 | −0.100902 | −0.044392 | −0.006622 | −0.009551 |
| B | −0.008931 | 0.0371692 | 0.0346864 | 0.0364558 | 0.0231065 | −0.004653 |
| D | 0.0011909 | −0.019765 | −0.008315 | −0.016181 | −0.014422 | 0.0022904 |
| E | 0.0049941 | 0.009314 | 0.0016309 | 0.005735 | 0.0047046 | −0.000625 |
| F | −0.005003 | −0.003302 | −0.000305 | −0.001638 | −0.00095 | 0.0001102 |
| G | 0.002311 | 0.0007687 | −7.38E−07 | 0.0003224 | 0.0001228 | −1.27E−05 |
| H | −0.000593 | −0.000107 | 1.59E−05 | −3.88E−05 | −9.87E−06 | 9.26E−07 |
| I | 8.18E−05 | 7.54E−06 | −2.96E−06 | 2.54E−06 | 4.48E−07 | −3.85E−08 |
| J | −4.78E−06 | −1.77E−07 | 1.73E−07 | −6.95E−08 | −8.76E−09 | 7.04E−10 |

TABLE 11

| | Third embodiment |
|---|---|
| BFL | 4.597 |
| F | 9.959 |
| TTL | 10.500 |
| Img | 5.6 |
| APE6 | 3.356 |
| f1 | 6.407 |
| f2 | −12.695 |
| f3 | 114.351 |
| f4 | −6.924 |
| f5 | 2.280 |

TABLE 11-continued

| | Third embodiment |
|---|---|
| f6 | −2.848 |
| BFL' | 1.597 |
| TTL' | 7.500 |

TABLE 12

| | Equation | Third embodiment |
|---|---|---|
| Equation 1 | 1 < TTL/BFL < 3 | 2.284 |
| Equation 2 | 1 < F/BFL < 3 | 2.167 |
| Equation 3 | 0.5 < F/TTL < 1.5 | 0.948 |
| Equation 4 | 0.5 < BFL/Img < 1.5 | 0.821 |
| Equation 5 | 0.5 < TTL/(Img × 2) < 1.5 | 0.938 |
| Equation 6 | 1 < BFL/APE6 < 2 | 1.370 |
| Equation 7 | 1.3 < Img/APE6 < 2 | 1.669 |
| Equation 8 | 0 < L1R1/\|L1R2\| < 1 | 0.194 |
| Equation 9 | 1 < (L4R1) × (L5R2) | 5.182 |
| Equation 10 | 0.1 < G2 − G1 | 0.137 |
| Equation 11 | 0.05 < G4 − G5 | 0.104 |
| Equation 12 | 0.1 < f1/F < 2 | 0.643 |
| Equation 13 | 0 < f1/\|f3\| < 1 | 0.056 |
| Equation 14 | 0.1 < T1 − (T2 + T4) | 0.562 |
| Equation 15 | \|f3\| > \|f1\| + \|f2\| + \|f4\| + \|f5\| + \|f6\| | Satisfaction |
| Equation 17 | 3 < TTL'/BFL' < 6 | 4.697 |
| Equation 18 | 0.1 < BFL'/Img < 0.5 | 0.285 |

Table 11 shows the items of the above-mentioned equations in the optical system 1000 according to the third embodiment, and shows TTL (Total track length), BFL (Back focal length), F value, Img, focal lengths f1, f2, f3, f4, f5, and f6 of each of the first to sixth lenses 110, 120, 130, 140, 150, and 160 of the optical system 1000. Also, FIGS. 12A and 12B shows result values of Equations 1 to 15, Equations 17 and 18 in the optical system 1000 according to the third embodiment. Referring to Table 12, it may be seen that the optical system 1000 according to the third embodiment satisfies at least one of Equations 1 to 15. In detail, it may be seen that the optical system 1000 according to the third embodiment satisfies all of Equations 1 to 15 above. Accordingly, the optical system 1000 according to the third embodiment may have improved optical characteristics, and may have modulation transfer function (MTF) characteristics, aberration characteristics, and distortion characteristics as shown in FIGS. 13 to 15. In detail, FIG. 14 is a measured graph of the aberration characteristics of the optical system 1000 according to the third embodiment, in which spherical aberration (Longitudinal spherical aberration), astigmatic field curves, and distortion are measured from left to right. In FIG. 14, X-axis may indicate a focal length (mm) or distortion (%), and Y-axis may indicate the height of an image. In addition, the graph for spherical aberration is a graph for light in a wavelength band of about 435 nm, about 486 nm, about 546 nm, about 587 nm, and about 656 nm, and the graph for astigmatism and distortion aberration is a graph for light in the wavelength band of 546 nm.

It may be seen that the optical system 1000 satisfies Equations 17 and 18. In detail, the plurality of lenses 100 of the optical system 1000 may move from the first position to the second position as one lens group. Accordingly, the TTL and BFL values of the optical system 1000 may change. That is, the third embodiment can control the TTL and BFL of the optical system 1000 by controlling the position of the lens group 100 according to whether the optical system 1000 is operated or not. For example, when operating the optical system 1000, the lens group 100 may be located at the first position. Accordingly, the optical system 1000 may acquire image information with set TTL and BFL values. Also, when the optical system 1000 is not operated, the lens group 100 may be located at the second position. In this case, the lens group 100 may be disposed closer to the image sensor 300, and the optical system 1000 may have TTL' and BFL' values smaller than TTL and BFL values at the first position. can Therefore, the optical system 1000 according to the third embodiment may have improved optical characteristics when the optical system 1000 is operated, and minimizes the overall length of the optical system 1000 when the optical system 1000 is not operated. Thus, it may be provided more compactly.

Referring to FIGS. 16A-17B are diagrams illustrating that a camera module according to an embodiment is applied to a mobile terminal. Referring to FIGS. 16A-17B, the camera module 10 according to the embodiment may be applied to the mobile terminal 1. The camera module 10 includes the above-described optical system 1000 and may include an image capture function. In addition, the camera module 10 may include at least one of an auto focus function, a zoom function, and an OIS function. The camera module 10 may process a still image or video frame obtained by the image sensor 300 in a shooting mode or a video call mode. The processed image frame may be displayed on a display unit (not shown) of the mobile terminal 1 and may be stored in a memory (not shown). In addition, although not shown in the drawing, the camera module may be further disposed on the front side of the mobile terminal 1500.

A flash module 30 may be further disposed on the rear surface of the mobile terminal 1. The flash module 30 may include a light emitting element emitting light therein. The flash module 30 may be operated by operating the camera of the mobile terminal 1 or by user control. The mobile terminal 1 may change the distance between the image sensor 300 and the lens group 100 according to whether the camera module 10 is operated.

Figure 16A:
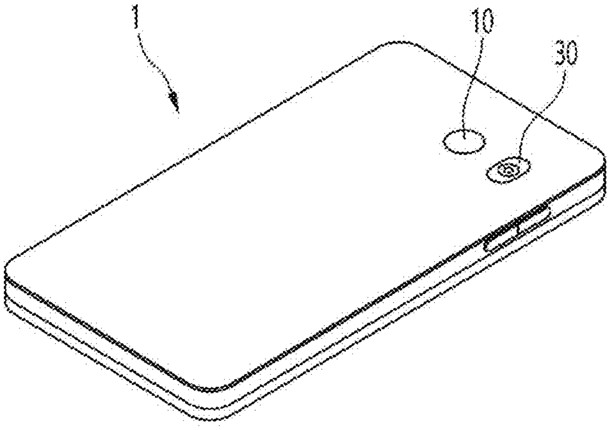
FIGS. 16A-17B are diagrams illustrating that a camera module according to an embodiment is applied to a mobile terminal.
Figure 16B:
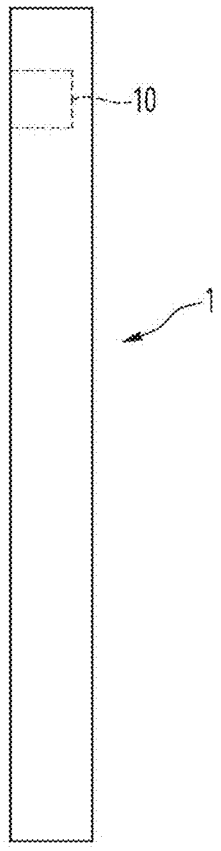

For example, referring to FIGS. 16A and 16B, the mobile terminal 1 may not operate the camera module 10. That is, the camera module 10 may be in an OFF state. In this case, the camera module 10 is disposed within the mobile terminal 1 as shown in FIGS. 16A and 16B and may not protrude from the surface of the mobile terminal 1. When the camera module 10 is in an OFF state, the lens group 100 including a plurality of lenses in the optical system 1000 of the camera module 10 may be disposed at a set position. In detail, the lens group 100 may be disposed at a second position spaced apart from the image sensor 300 by a second distance d2 by a driving member. Accordingly, the optical system 1000 including the lens group 100 may have a second total track length (TTL) and a second back focal length (BFL) corresponding to the second position, for example, the above-described TTL' and BFL'. When the lens group 100 is located in the second position, it may be difficult for the camera module 10 to obtain image information.

Figure 17B:
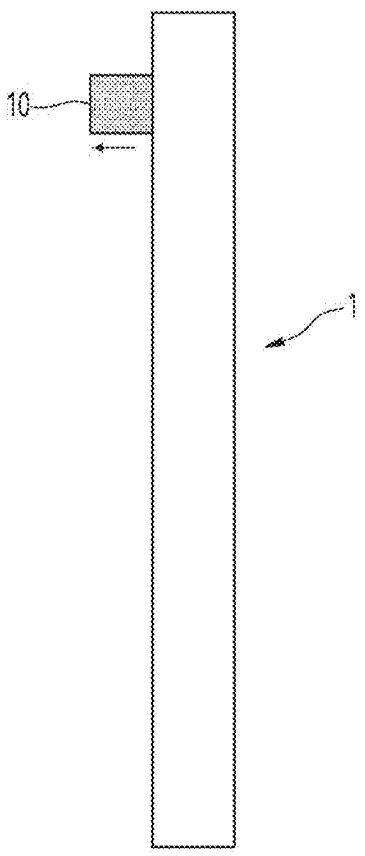
Figure 17A:
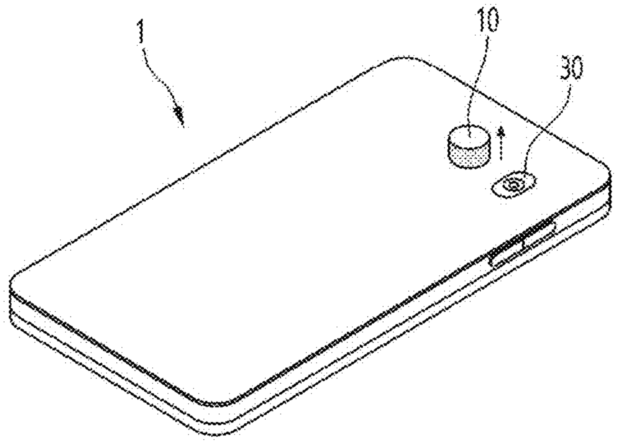

Referring to FIGS. 17A and 17B, the mobile terminal 1 may operate the camera module 10. That is, the camera module 10 may be in an ON state. In this case, as shown in FIGS. 17A and 17B, the camera module 10 may move so that a part or all of the camera module 10 protrudes from the surface of the mobile terminal 1. In addition, although not shown in the drawing, when the camera module 10 is in an ON state, the camera module 10 may move only inside the mobile terminal 1 without protruding from the surface of the mobile terminal 1 compared to an OFF state. When the camera module 10 is in an ON state, the lens group 100 including a plurality of lenses in the optical system 1000 of the camera module 10 may be disposed at a set position. In detail, the lens group 100 may be disposed at a first position spaced apart from the image sensor 300 by a first distance d1. Here, the first distance d1 may be greater than the second distance d2. Accordingly, the optical system 1000 including the lens group 100 may have a first TTL and a first BFL corresponding to the first position, for example, the above-described TTL and BFL. In this case, the first TTL may be greater than the second TTL, and the first BFL may be greater than the second BFL. When the lens group 100 is located in the first position, the camera module 10 may acquire image information. At this time, when the lens group 100 moves from the first position to the second position or from the second position to the first position, the distance between the first to sixth lenses 110, 120, 130, 140, 150, and 160 may be constant. That is, even if the position of the lens group 100 changes, the distance between adjacent lenses may be constant.

The camera module 10 according to the embodiment may be provided in the form of a pop-up camera capable of controlling TTL and BFL of the optical system 1000 depending on whether the camera module 10 is operated. For example, when operating the camera module 10, the lens group 100 may be moved to a set first position to secure TTL and BFL for realizing optical performance. When the camera module 10 is not operated, the lens group 100 may be moved to a set second position. In this case, the lens group 100 may have TTL (first TTL) and BFL (second BFL) smaller than TTL (second TTL) and BFL' (second BFL) for realizing optical performance. As an example, referring to Tables 3, 7, and 11, it may be seen that TTL and BFL at the first position decrease by about 3 mm compared to TTL' and BFL' at the second position, respectively. That is, in the embodiment, when the camera module 10 does not operate, the optical system 1000 may minimize the overall length, and the camera module 10 may be compactly provided to the mobile terminal 1 to which it is applied.

Features, structures, effects, etc. described in the embodiments above are included in at least one embodiment of the present invention, and are not necessarily limited to only one embodiment. Furthermore, the features, structures, and effects illustrated in each embodiment can be combined or modified with respect to other embodiments by those skilled in the art in the field to which the embodiments belong. Therefore, contents related to these combinations and variations should be construed as being included in the scope of the present invention. Although described based on the embodiments, this is only an example, this invention is not limited, and it will be apparent to those skilled in the art that various modifications and applications not illustrated above are possible without departing from the essential characteristics of this embodiment. For example, each component specifically shown in the embodiment can be modified and implemented. And the differences related to these modifications and applications should be construed as being included in the scope of the present invention as defined in the appended claims.

The invention claimed is:

1. An optical system comprising:

first to sixth lenses sequentially arranged along an optical axis from an object side to an image side, wherein the first lens has a positive refractive power, wherein an object-side surface of the first lens is convex on the optical axis, wherein an image-side surface of the first lens is concave on the optical axis, wherein the third lens has positive or negative refractive power, and at least one of an object-side surface and an image-side surface of the third lens includes an inflection point, wherein the sixth lens has negative refractive power and at least one of an object-side surface and an image-side surface of the sixth lens includes an inflection point, wherein the object-side surface of the sixth lens is concave on the optical axis, wherein the optical system satisfies following Equation 1:

$$1<TTL/BFL<3 \quad \text{[Equation 1]}$$

(In Equation 1, TTL (Total track length) defines a distance from an apex of the object-side surface of the first lens to an upper surface of an image sensor in a direction of the optical axis, and BFL (Back focal length) defines a distance from an apex of the image-side surface of the sixth lens to the upper surface of the image sensor in the direction of the optical axis), wherein a center thickness of the first lens is T1, wherein a center thickness of the second lens is T2, wherein a center thickness of the fourth lens is T4, and wherein the optical system satisfies 0.1 mm<T1−(T2+T4).

2. The optical system of claim 1, wherein the second lens has a negative refractive power, and wherein the second lens has a meniscus shape convex toward the object side.

3. The optical system of claim 1, wherein the third lens has a negative refractive power, wherein the fourth lens has a negative refractive power, wherein the fifth lens has a positive refractive power, and wherein an absolute value of a focal length of the third lens is greater than a sum of absolute values of focal lengths of the first, second, fourth, fifth, and sixth lenses.

4. The optical system of claim 3, wherein the third lens has a meniscus shape convex toward the object side, and wherein the fourth lens has a meniscus shape convex toward the image side.

5. The optical system according to claim 1, wherein the optical system satisfies following Equation 2:

$$1<BFL/APE6<2 \quad \text{[Equation 2]}$$

(In Equation 2, APE6 defines a distance in a direction perpendicular to the optical axis from the optical axis to an effective diameter of the image-side surface of the sixth lens).

6. The optical system of claim 5, wherein the optical system satisfies following Equation 3:

$$1.3<Img/APE6<2 \quad \text{[Equation 3]}$$

(In Equation 3, Img defines a value of ½ of a diagonal length of an effective region of an image sensor).

7. A camera module comprising:

the optical system of claim 1 and a driving member, wherein the driving member is configured to move a position of a lens group including the first to sixth lenses in the direction of the optical axis according to whether the camera module is operated.

8. The camera module of claim 7, wherein when the camera module is operated, the lens group is moved to a first position spaced apart from the image sensor by a first distance, and wherein the optical system has a first TTL defined as total track length (TTL) and a first BFL defined as a back focal length (BFL).

9. The camera module of claim 8, wherein when the camera module is not operated, the lens group is moved to a second position spaced apart from the image sensor by a second distance smaller than the first distance, wherein the optical system at the second position has a second TTL and a second BFL, wherein the second TTL is smaller than the first TTL, and wherein the second BFL is smaller than the first BFL.

10. The optical system of claim 1, wherein a total focal length of the optical system is F and a focal length of the first lens is f1, and wherein the optical system satisfies $0.1<f1/F<2$.

11. An optical system comprising:

first to sixth lenses sequentially arranged along an optical axis from an object side to an image side, wherein the first lens has a positive refractive power, wherein an object-side surface of the first lens is convex on the optical axis, and an image-side surface of the first lens is concave on the optical axis, wherein at least one of an object-side surface and an image-side surface of the third lens includes an inflection point, wherein the sixth lens has negative refractive power, wherein an object-side surface of the sixth lens is concave on the optical axis, wherein a sensor-side surface of the sixth lens is concave on the optical axis, wherein a center thickness of the first lens is T1, wherein a center thickness of the second lens is T2, wherein a center thickness of the fourth lens is T4, and wherein the optical system satisfies $$0.1\ \text{mm}<T1-(T2+T4).$$

12. The optical system of claim 11, wherein a radius of curvature of the object-side surface of the first lens is L1R1, wherein a radius of curvature of the image-side surface of the first lens is L1R2, and wherein the optical system satisfies $$0<L1R1/|L1R2|<1.$$

13. The optical system of claim 11, wherein a distance in a direction of the optical axis from an apex of the image-side surface of the sixth lens to an upper surface of an image sensor is a back focal length (BFL), wherein a distance in a direction perpendicular to the optical axis from the optical axis to an end of an effective region of the image-side surface of the sixth lens is APE6, and wherein the optical system satisfies $$1<\text{BFL}/\text{APE6}<2.$$

14. The optical system of claim 11, wherein a distance in a direction of the optical axis from an apex of the object-side surface of the first lens to an upper surface of an image sensor is a total track length (TTL), wherein ½ of a diagonal length of an effective region of the image sensor is Img, wherein the optical system satisfies:

$$0.5<\text{TTL}/(\text{Img}\times 2)<1.5.$$

15. The optical system of claim 11, wherein a distance in a direction of the optical axis from an apex of the object-side surface of the first lens to an upper surface of an image sensor is a total track length (TTL), wherein a distance in the direction of the optical axis from an apex of the image-side surface of the sixth lens to an upper surface of an image sensor is a back focal length (BFL), wherein the optical system satisfies $$1<\text{TTL}/\text{BFL}<3.$$

16. The optical system of claim 11, wherein the second lens has a negative refractive power, wherein the second lens has a meniscus shape convex toward the object side, wherein the third lens has a negative refractive power, and wherein the third lens has a meniscus shape convex toward the object side.

17. The optical system of claim 11, wherein the fourth lens has a negative refractive power, wherein the fifth lens has a positive refractive power, and wherein an absolute value of a focal length of the third lens is greater than a sum of absolute values of focal lengths of the first, second, fourth, fifth, and sixth lenses.

18. The optical system of claim 17, wherein the fourth lens has a meniscus shape convex toward the image side, and wherein an optical axis distance between the third lens and the fourth lens is greater than an optical axis distance between the fifth lens and the sixth lens.

19. The optical system of claim 11, wherein a total focal length of the optical system is F, wherein a distance in a direction of the optical axis from an apex of the object-side surface of the first lens to an upper surface of an image sensor is a total track length (TTL), and wherein the optical system satisfies $$0.5<F/\text{TTL}<1.5.$$

20. The optical system of claim 19, wherein a distance in the direction of the optical axis from an apex of the image-side surface of the sixth lens to the upper surface of the image sensor is a back focal length (BFL), and wherein the optical system satisfies $$1<F/\text{BFL}<3.$$

* * * * *